United States Patent [19]
Nagasawa

[11] Patent Number: 5,151,832
[45] Date of Patent: Sep. 29, 1992

[54] TAPE LOADING DEVICE

[75] Inventor: Tsuyoshi Nagasawa, Tokyo, Japan

[73] Assignee: Sony Corporation, Tokyo, Japan

[21] Appl. No.: 625,950

[22] Filed: Dec. 11, 1990

[30] Foreign Application Priority Data

Dec. 26, 1989 [JP] Japan .................. 1-337002

[51] Int. Cl.[5] .................................. G11B 5/027
[52] U.S. Cl. ............................ 360/85; 360/95
[58] Field of Search .................. 360/85, 83–84, 360/95, 96.3, 96.5, 93

[56] References Cited

U.S. PATENT DOCUMENTS

| | | | |
|---|---|---|---|
| 4,785,362 | 11/1988 | Nozawa et al. | 360/85 |
| 4,788,609 | 11/1988 | Yamada et al. | 360/85 |
| 4,912,578 | 3/1990 | Katohno et al. | 360/85 |
| 4,951,164 | 8/1990 | Yasaka et al. | 360/95 X |

FOREIGN PATENT DOCUMENTS 196095 10/1986 European Pat. Off. .
2192302 6/1987 United Kingdom .

Primary Examiner—John H. Wolff
Attorney, Agent, or Firm—Lewis H. Eslinger; Jay H. Maioli

[57] ABSTRACT

A tape loading device that draws a tape from a tape cassette and loads it into a tape traveling path by tape loading elements as it is moved from a return position to an advance position has a loading motion and an unloading motion that are mechanically triggered as a result of rotation of a mode motor and in which, in order to load or unload the tape, the tape loading elements undergo reciprocal motion in response to normal or reverse rotation of a capstan motor, whereby it is possible to load and unload the tape at high speed and to miniaturize the tape loading device.

16 Claims, 24 Drawing Sheets

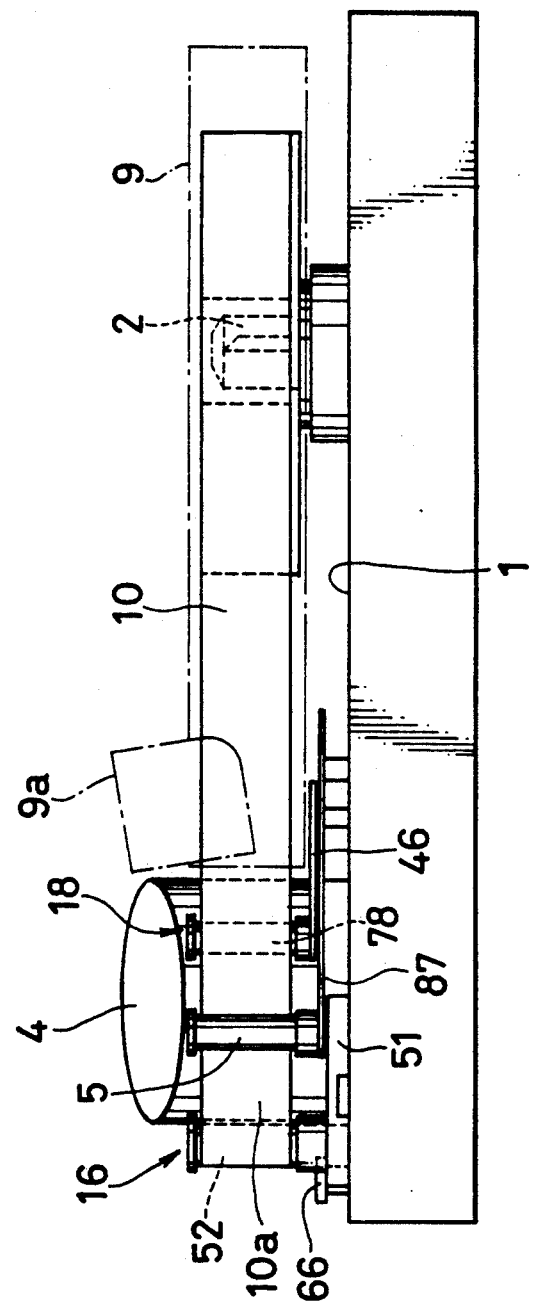

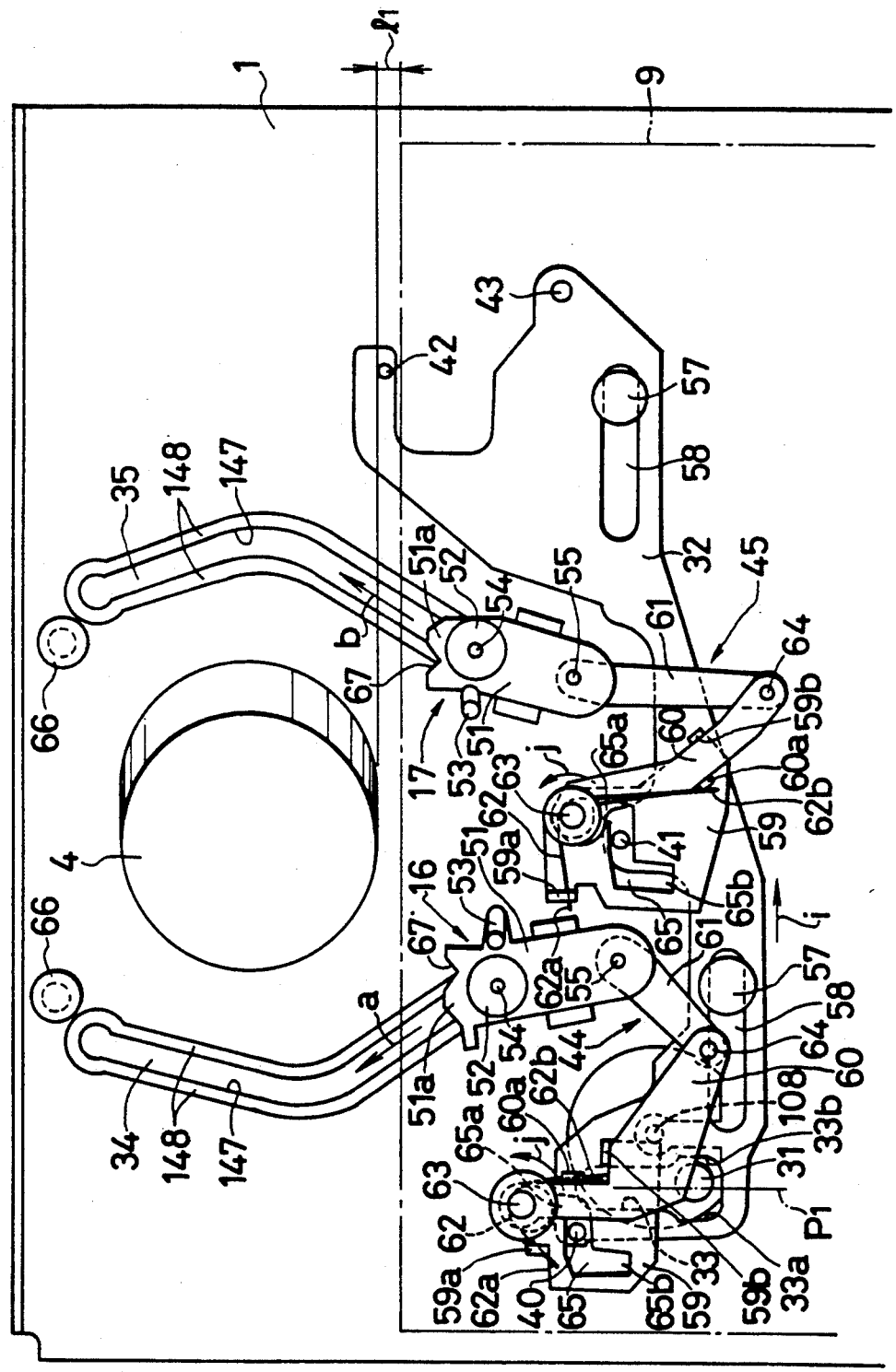

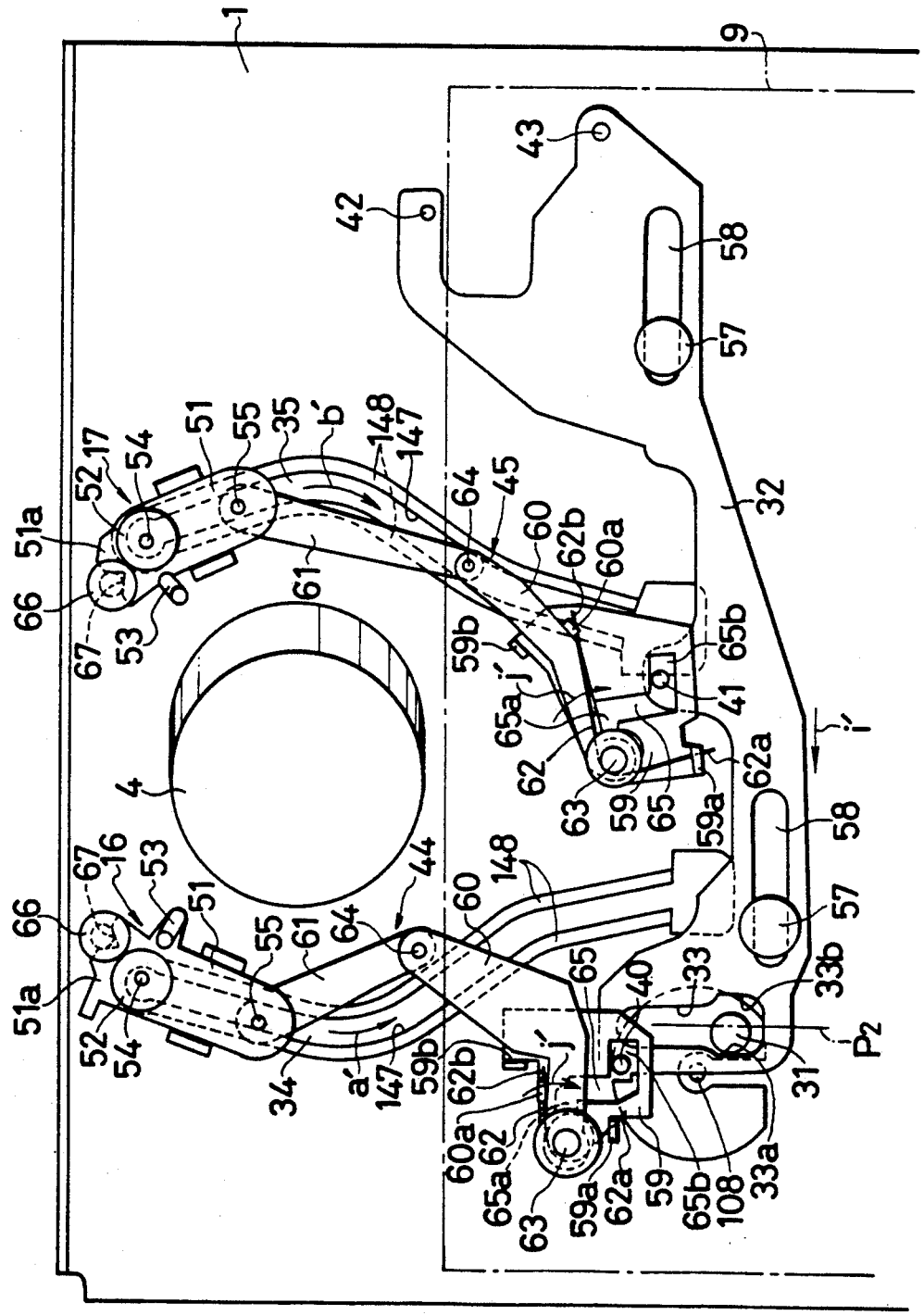

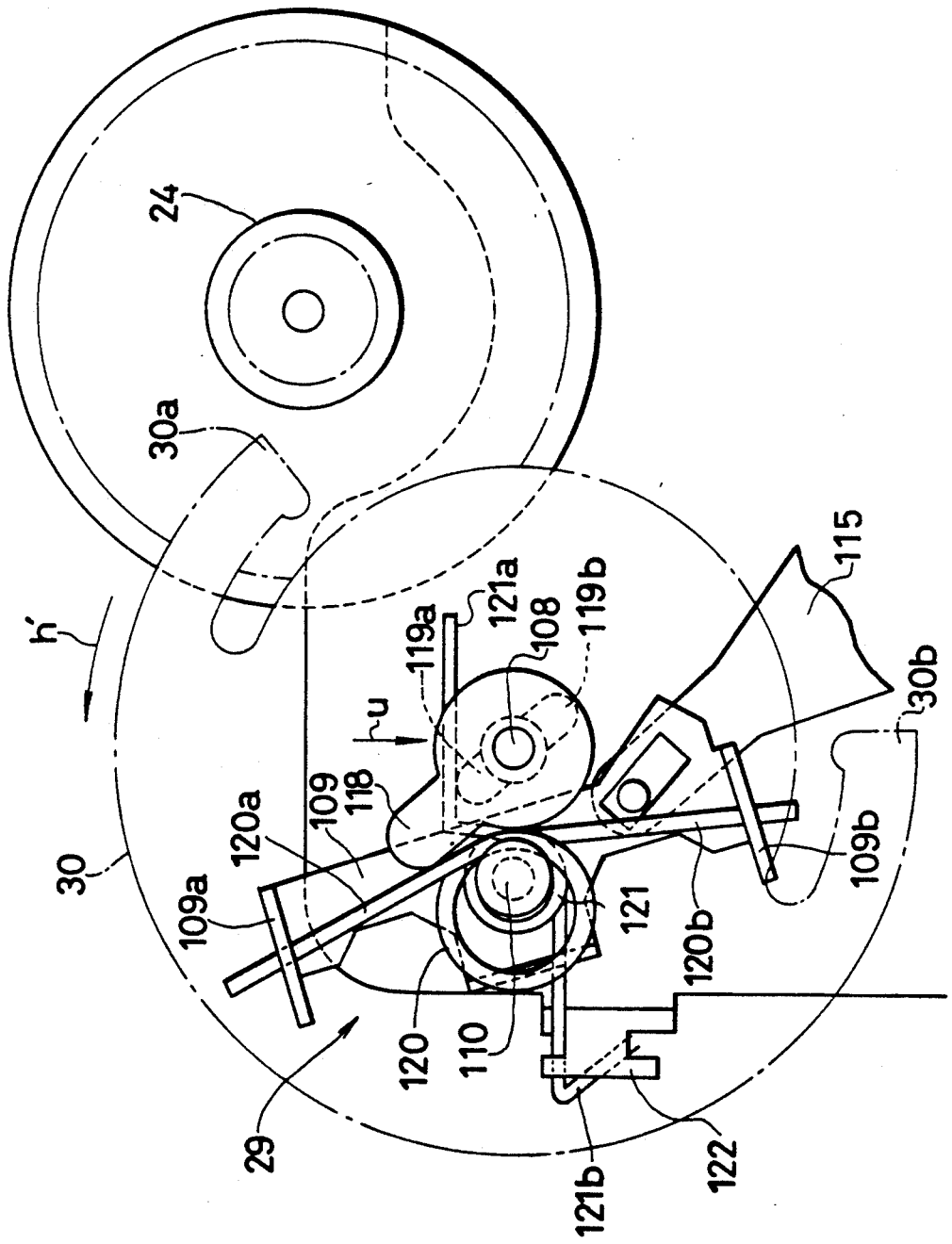

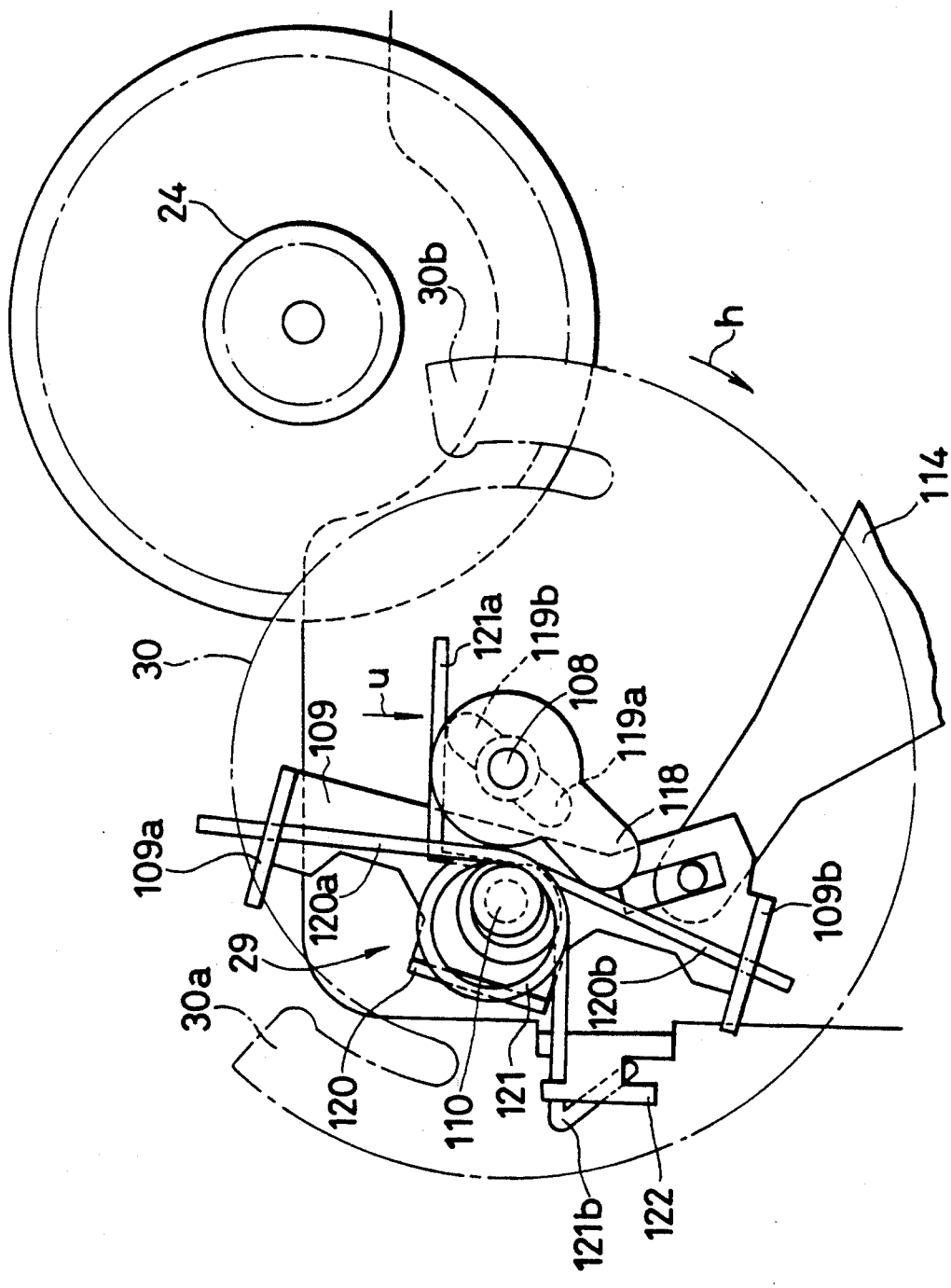

a# TAPE LOADING DEVICE

BACKGROUND OF THE INVENTION

1. Field of the Invention

This invention relates generally to a tape loading device for digital-audio tape cassette recorders and video cassette tape recorders and, more particularly, to miniature cassette recording and/or reproducing apparatus of that kind.

2. Description of the Background

In previously proposed miniature cassette recording and/or reproducing apparatus, the change-over between a loading mode and an unloading mode and the successively conducted loading and unloading of the tape are carried out using only a single motor, and in order to obtain the necessary torque the motor is required to rotate at a low speed.

If the loading mechanism is merely moved between an advanced position and a return position thereof, the motor need not be particularly powerful, but when the loading mechanism reaches its advanced position in a loading operation it is acting against the force of a limiting spring, so that the motor is required to have relatively large power. Once again, to obtain such large power the motor has to be driven at a low speed. Thus, the change-over operation between the loading mode and the unloading mode will be also carried on at a low speed.

In other words, if the change-over operations between the loading mode and the unloading mode and the actual loading and unloading of the tape are carried out by only a single motor, both operations can not be conducted at high speed, so that they will take a relatively long time.

OBJECTS AND SUMMARY OF THE INVENTION

Accordingly, it is an object of the present invention to provide a tape loading device in which the change-over operation between a loading mode and an unloading mode is effected at high speed by a motor used only for that operation and the drive of the reciprocating loading mechanism is also carried out at high speed by driving the capstan motor in normal and reverse directions, so as to reduce the time required for the tape to be drawn from the cassette and completely loaded, as compared with previously proposed tape loading devices.

Another object of the present invention is to provide a tape loading device in which the tape loading and unloading are obtained not by driving a motor used only for that purpose, but by utilizing the capstan motor, so as to miniaturize the tape loading device.

A further object of the present invention is to provide a tape loading device having a plurality of first tape loading elements for directly guiding a magnetic tape and a single second tape loading element for selectively reciprocating the first tape loading element, and the second tape loading element is reciprocated by the capstan motor, so as to miniaturize the tape loading device and reduce the weight thereof.

Still a further object of the invention is to provide a tape loading device, in which a principal part of the first tape loading elements comprise an expandable and contractible link, and the second tape loading element comprises a sliding plate, so as to reduce the number of parts and simplify the construction of the tape loading device, with the result that the tape loading motion is made smoother.

Still another object of the invention is to provide a tape loading device in which even if a tooth of a partially toothless gear collides with that of a drive gear at a time when the partially toothless gear is rotated to be meshed with the drive gear due to the functioning of a triggering lever, the impact of the colliding teeth is effectively absorbed by a single spring, both ends of which are supported by respective distal ends of the triggering lever, so as smoothly mesh the partially toothless gear with the drive gear and not to cause any damage to the colliding teeth. This provides a smooth and secure motion to the triggering mechanism when the tape is loaded and unloaded and simplifies the construction of the triggering mechanism, because the partially toothless gear is rotated in the normal and reverse directions only by the single spring.

The above and other objects, features, and advantages of the present invention will become apparent from the following detailed description of a preferred embodiment when read in conjunction with the accompanying drawings, in which like reference numerals are used to identify the sam or similar parts in the several views.

BRIEF DESCRIPTION OF THE DRAWINGS

FIG. 2 is an elevational view of the tape loading device of FIG. 1;

FIGS. 4A and 4B are explanatory plan views showing the drive mechanism of the main loading mechanism incorporated in the tape loading device of FIG. 1 in different stages of operation, respectively;

FIGS. 10A to 10D are plan views showing in greater detail the triggering mechanism of FIGS. 9A and 9B in different stages of operation, respectively;

DETAILED DESCRIPTION OF A PREFERRED EMBODIMENT

Figure 1:
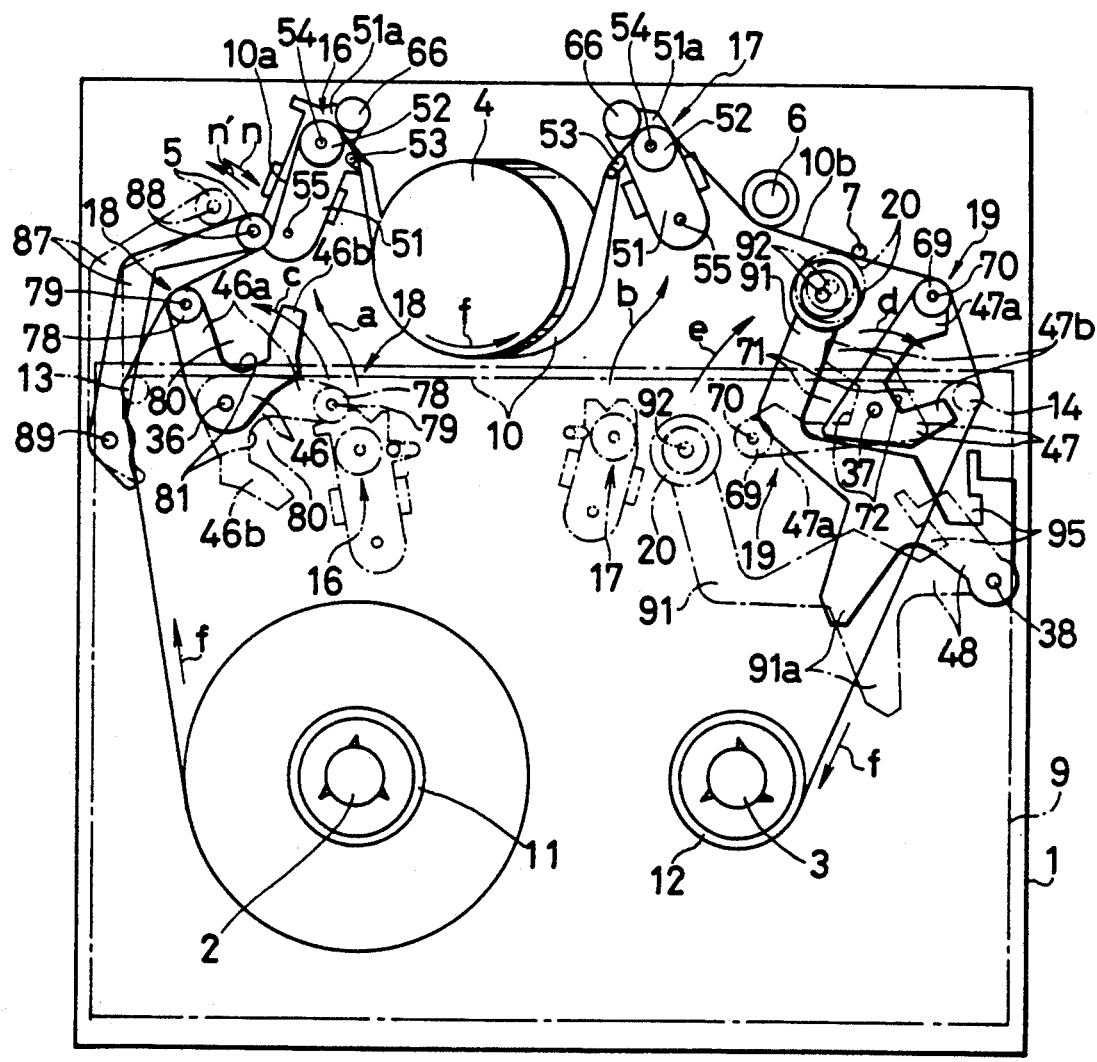
FIG. 1 is a plan view of a tape loading device according to an embodiment of the present invention.

In FIGS. 1 and 2 a tape loading device for a digital cassette tape recorder is shown, in which a supply reel base 2 and a take-up reel base 3 are located at one portion of a main chassis 1, and a tape travel path defined by a rotary head drum 4, a tension detecting pin 5, a tape guide 6, a capstan 7 and the like is formed at another portion of main chassis 1.

A magnetic tape 10 is wound around a supply reel 11 and a take-up reel 12 that are in a cassette that is shown in phantom at 9. Magnetic tape 10 passes between a pair of tape guides 13 and 14 arranged at the corners of the inside of a front lid 9a of cassette 9. Cassette 9 is loaded downwardly onto reel bases 2 and 3 by a cassette loading mechanism (not shown), so that reels 11 and 12 are respectively fitted onto reel bases 2 and 3.

Upon the loading of cassette 9, front lid 9a is pivoted upwardly and the front of cassette 9 is opened. A plurality of tape loading elements 16 to 19 and a pinch roller 20 are upwardly inserted behind magnetic tape 10 that is arranged between tape guides 13 and 14. The loading elements are constituted by a pair of main loading elements 16 and 17 located on the supply and take-up sides, respectively, and a pair of subsidiary loading elements 18 and 19, also located on the supply and take-up sides, respectively.

Upon loading cassette 9, the plurality of loading elements 16 to 19 and pinch roller 20 are moved from inactive positions inside cassette 9, indicated by broken lines in FIG. 1, to active positions outside cassette 9, indicated by solid lines in FIG. 1, in directions indicated by arrows a, b, c, d and e, respectively. Magnetic tape 10 is supplied from supply reel 11 by the plurality of loading elements 16 to 19 by being pulled out of cassette 9 and loaded in the tape travel path, indicated by the solid line showing of tape 10 in FIG. 1.

In this case, the main loading elements 16 and 17 are moved toward the tape supply side and the tape take-up side, respectively, with respect to rotary head drum 4. Magnetic tape 10 is loaded so that it is helically wound around the circumferential surface of rotary head drum 4 at a predetermined winding angle. The subsidiary loading element 18 on the tape supply side causes a supply side 10a of magnetic tape 10 to pass along tension detecting pin 5. The subsidiary loading means 19 on the tape take-up side causes a take-up side 10b of magnetic tape 10 to pass along tape guide 6 and capstan 7.

When the mode of the tape recorder is changed to the recording or reproducing mode, upon tape loading pinch roller 20 urges magnetic tape 10 against capstan 7, indicated by the long and short dashed line in FIG. 1. At the same time, tension detecting pin 5 is brought into contact with magnetic tape 10. When take-up reel 12 is rotated by take-up reel base 3, magnetic tape 10 is supplied from supply reel 11 and is driven at a constant speed along the tape travel path in the direction indicated by the arrow f, so as to be taken up by take-up reel 12. A digital signal on magnetic tape 10 may then be recorded or reproduced by rotary head drum 4.

During recording or reproduction, the tension of magnetic tape 10 is detected by tension detecting pin 5, so that the back tension on magnetic tape 10 is controlled to be constant. Note that tap unloading involves a sequence opposite to the above-described tape loading sequence, that is, magnetic tape 10 is rewound on supply reel 11 and returned to the inside of cassette 9.

Figure 3A:
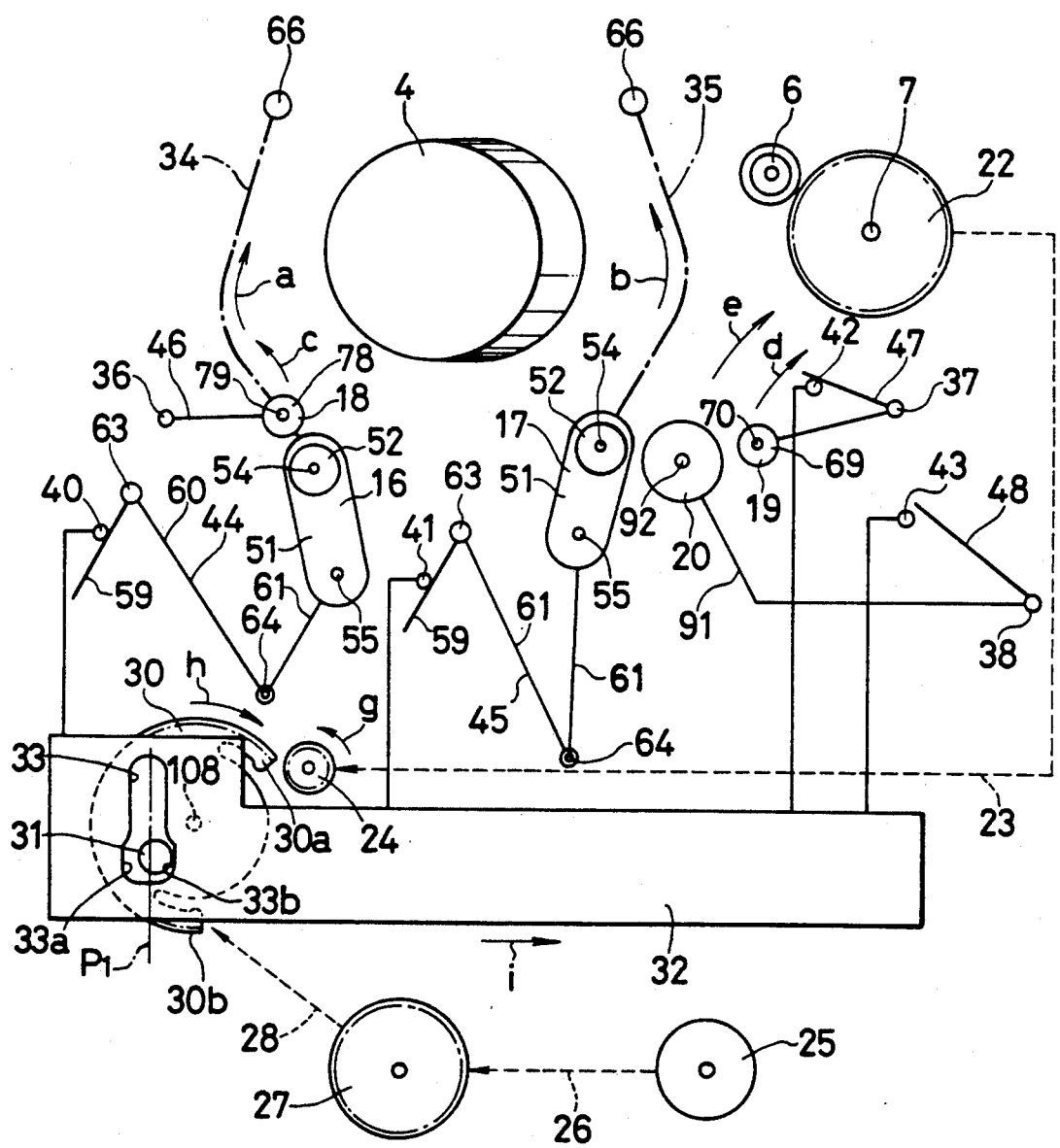
FIGS. 3A and 3B are explanatory plan views showing the drive mechanism of the tape loading device of FIG. 1 in different stages of operation, respectively.
Figure 3B:
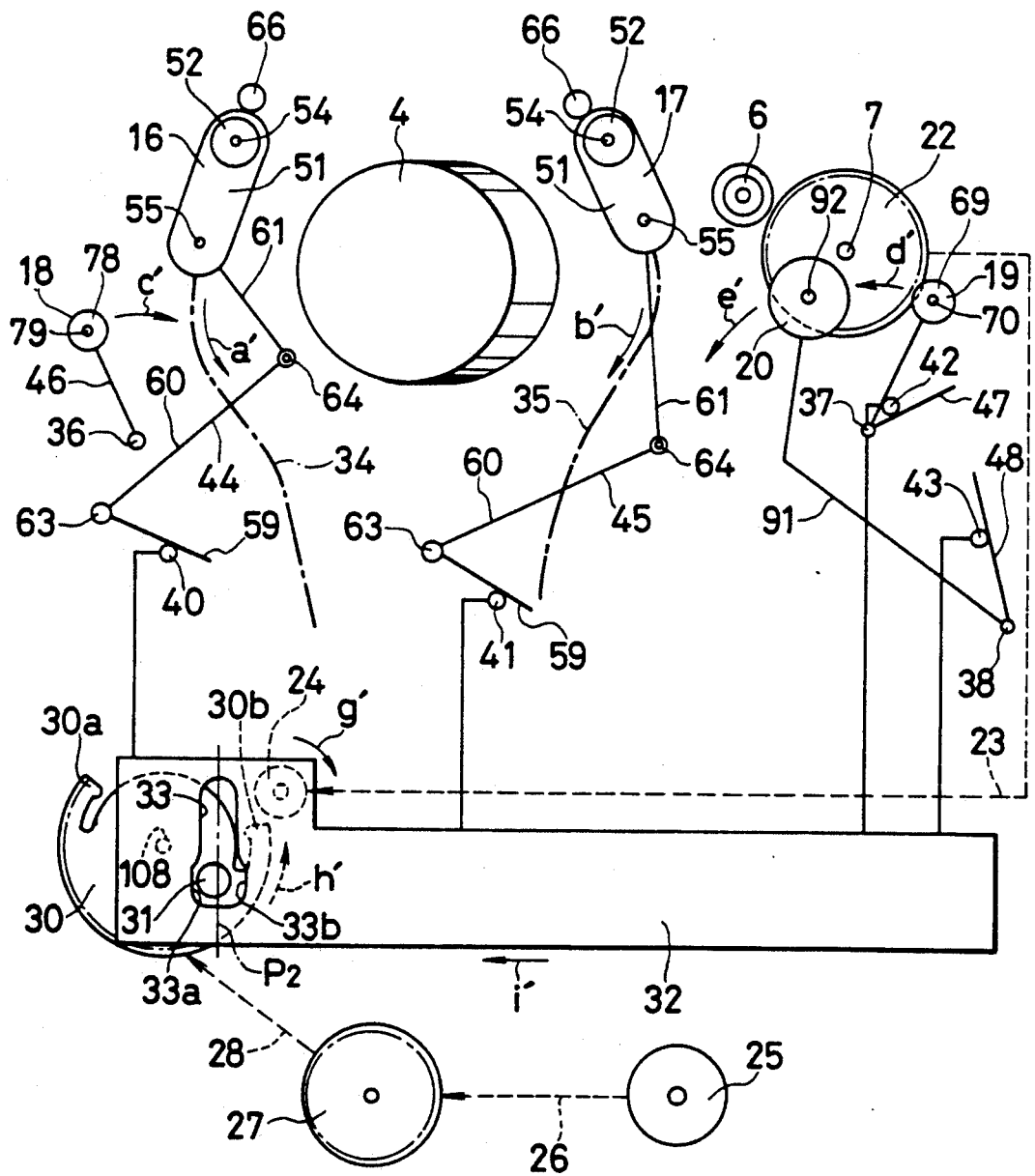

A drive mechanism of the tape loading device is shown in FIGS. 3A and 3B, in which a reversible capstan drive motor 22 for driving capstan 7 causes a drive gear 24 to rotate through a gear train represented by a dashed line 23, in a forward or reverse direction indicated by arrows g or g', respectively.

A mode motor 25 controls rotation of a mode changing cam gear 27 through a gear train represented by a dashed line 26. Cam gear 27 controls rotation of a partially toothless gear 30 of a triggering mechanism (not shown in FIGS. 3A and 3B) through a link mechanism 28, represented by a dashed line, in the direction of arrows h or h'.

A drive pin 31 is formed on partially toothless gear 30 and is inserted into an elongate hole 33 formed in a loading/unloading sliding plate 32 that is mounted to be slidable in the directions indicated by arrows i and i'.

Both of the main loading elements 16 and 17 can be reciprocated along a pair of guide rails 34 and 35, represented by dot and dash lines, in directions indicated by arrows a and b and arrows a' and b', respectively. Subsidiary loading elements 18 and 19 and pinch roller 20 can be reciprocated about fulcrum pins 36, 37, and 38 in the directions indicated by the arrows c, d, and e or arrows c', d' and e', respectively.

The tape loading operation is started from the unloading state shown in FIG. 3A and in response to a loading command signal capstan motor 22 rotates in the forward direction to rotate drive gear 24 through gear train 23 in the forward direction, indicated by arrow g, and mode motor 25 rotates to drive cam gear 27 through gear train 26 in the forward direction. The triggering mechanism, which will be described below with reference to FIGS. 9A to 11, is then driven through link assembly 28 and partially toothless gear 30 is rotated by a mechanical triggering operation in the direction indicated by the arrow h and is meshed with drive gear 24, thereby setting the loading mode.

Partially toothless gear 30 is continuously driven by drive gear 24 through a predetermined angle in the direction of arrow h. As a result, sliding plate 32 is driven by drive pin 31 in elongate hole 33, so that sliding plate 32 is moved forward from an unloading completion position $P_1$ in FIG. 3A to a loading completion position $P_2$ in FIG. 3B in the direction indicated by arrow i.

A pair of drive pins 40 and 41 extending from sliding plate 32 are used to drive a pair of extendible link assemblies 44 and 45 that in turn drive both main loading elements 16 and 17, respectively. A second pair of drive pins 42 and 43 extending from sliding plate 32 are used to drive levers 47 and 48 acting upon subsidiary loading means 19 and pinch roller 20, respectively.

As a result of the movement of sliding plate 32, both main loading elements 16 and 17 are driven by the respective link assemblies 44 and 45 and are moved from the inactive positions to the active positions along guide rails 34 and 35 in the directions of arrows a and b, respectively. At the same time, subsidiary loading element 19 and pinch roller 20 are driven by levers 47 and 48 and are moved from the inactive positions to the active positions in the directions of the arrows d and e, respectively. Subsidiary loading element 18 is pushed by main loading element 16 and is then moved from the inactive position to the active position by a lever 46. The tape loading operation is thus completed, and the state shown in FIG. 3B is obtained.

The tape unloading operation will then be started from the tape loaded state, as shown in FIG. 3B, in which in response to an unloading command signal, capstan motor 22 rotates in the reverse direction to rotate drive gear 24 in the reverse direction indicated by arrow g'. At the same time, mode motor 25 is caused to rotate in the reverse direction to rotate cam gear 27 in the reverse direction, so that the partially toothless gear 30 is rotated in the direction of the arrow h' by a mechanical triggering operation of the triggering mechanism, not shown in FIG. 3B. Partially toothless gear 30 is then meshed with drive gear 24, thereby setting an unloading mode.

The partially toothless gear 30 is continuously rotated by drive gear 24 through a predetermined angle in the direction of arrow h', and sliding plate 32 is moved backward in the direction of arrow i' by drive pin 31 from the loading completion position $P_2$ of FIG. 3B to the unloading completion position $P_1$ of FIG. 3A.

The link assemblies 44 and 45 and levers 47 and 48 are driven by the drive pins 40, 41, 42, and 43 extending from sliding plate 32, and main loading elements 16 and 17, subsidiary loading element 19, and pinch roller 20 are moved from the active positions to the inactive positions in the directions of the arrows a', b', d' and e', respectively. Note that subsidiary loading element 18 is moved from the inactive position to the active position in the direction of arrow c' upon movement of the main loading element 16. The tape unloading operation is thus completed, and the state shown in FIG. 3A is restored.

In the drive mechanism of the overall tape loading device having the arrangement described above, the loading and unloading modes can be switched by the mode motor 25. The loading/unloading operations for reciprocally driving the loading elements 16 to 19 can be performed by forward/reverse rotation of capstan motor 22. Therefore, the time required from insertion of cassette 9 to the end of the loading operation of magnetic tape 10 is very short. Since capstan motor 22 has high power due to the flywheel effect, this high power is applied to the loading of magnetic tape 10 when loading elements 16 and 17 are positioned at respective stops 66 that serve as active positioning elements against limiting springs 62, shown in FIG. 4B. In addition, since capstan motor 22 also serves as the loading/unloading drive motor, a special loading/unloading motor is not required.

Operation of a drive mechanism using sliding plate 32 to drive both main loading elements 16 and 17 is described in detail with reference to FIGS. 4A and 4B, in which each of the main loading elements 16 and 17 is arranged such that a tape guide 52 consisting of a roller and an inclined guide pin 53 are mounted on a sliding block 51. Each sliding block 51 has pins 54 and 55 having lower portions extending below sliding block 51 that are guided by guide rails 34 and 35. Each tape guide 52 is rotatably mounted on the upper end portion of a corresponding pin 54 vertically extending upward through sliding block 51.

Sliding plate 32 is arranged under cassette 9 that is horizontally loaded on reel tables 2 and 3, as described above, and is guided by a plurality of guide pins 57 on main chassis 1 that cooperate with a plurality of guide grooves 58 in sliding plate 32, so as to be slidable in the directions of arrows i and i' parallel to the longitudinal direction, that is, parallel to a line connecting the centers of reels 11 and 12 of cassette 9.

Each of the extendible link assemblies 44 and 45 comprises a limiting link 59, a pair of connecting links 60 and 61 and a limiting spring 62, and links 59 and 60 are pivotable in directions indicated by arrows j and j' about pivots 62 mounted on main chassis 1. Connecting links 60 and 61 of each link assembly 44 or 45 are connected to a respective pin 64 and each link 61 is connected by a pin 55 to each sliding block 51. Limiting springs 62 respectively abut against projections 59a and 60a formed on the links 59 and 60 of each link assembly 44, 45 respectively. Link 60 abuts against a projection 59b of the corresponding link 59 by the corresponding limiting spring 62 from the direction of the arrow j.

The pair of drive pins 40 and 41 extending from sliding plate 32 are loosely fitted in L-shaped slots 65 formed in links 59, respectively. The elongate hole 33 formed at one side of sliding plate 32 extends in a direction perpendicular to the sliding direction, that is, perpendicular to the directions of arrows i and i'. The pair of stops 66 are formed at the active positions of the main loading elements 16 and 17 on main chassis 1.

In the operation of the above-described mechanism, at the time of tape loading sliding plate 32 is slid by drive pin 31 of partially toothless gear 30 from the unloading completion position $P_1$, shown in FIG. 4A, to the loading completion position $P_2$, shown in FIG. 4B. Each of the drive pins 40 and 41 urges one end 65a of each slot 65 of link 59 of the corresponding one of link assemblies 44 and 45. Links 59 respectively cause links 60 to pivot about their respective pivots 63 through limiting springs 62 in the direction of the arrow j. Sliding forces in the directions of the arrow a and b are applied to the sliding blocks 51 of main loading elements 16 and 17 through links 61, respectively. More specifically, the pairs of links 60 and 61 of the link assemblies 44 and 45 are gradually extended from a V-shaped folded state, shown in FIG. 4A, to a straightened state, shown in FIG. 4B. Therefore, sliding blocks 51 are moved from the inactive positions of FIG. 4A to the active positions of FIG. 4B along guide rails 34 and 35 in the directions of arrows a and b, respectively.

Magnetic tape 10 is pulled from cassette 9 by tape guides 52 and the inclined guide pins 53 of main loading elements 16 and 17, as shown in FIG. 1. Magnetic tape 10 is then wound around the circumferential surface of rotary head drum 4. In this case, the winding and helical angles of magnetic tape 10 that is helically wound around rotary head drum 4 are regulated by the inclined guide pins 53 of main loading elements 16 and 17.

As shown in FIG. 4B, when main loading elements 16 and 17 are moved to their active positions, positioning V-grooves 67 formed on the front end faces of sliding blocks 51 are brought into contact with and urged against the pins forming stops 66 by action of limiting springs 62 in the directions of arrows a and b and are positioned so that each of drive pins 40 and 41 of sliding plate 32 is fitted in the other end 65b of slot 65 in the respective one of links 59, thereby, completing the tape loading operation.

At the time of tape unloading, as described above, sliding plate 32 is slid by drive pin 31 of the partially toothless gear 30 from the loading completion position $P_2$, shown in FIG. 4B, to the unloading completion position $P_1$, shown in FIG. 4A, in the direction of the arrow i'. Drive pins 40 and 41 respectively urge links 59 of the link assemblies 44 and 45 through slots 65 in the direction of arrow j'. Links 60 are respectively pivoted about pivots 63 by the projections 59b of links 59 in the direction of arrow j'. Sliding forces are applied to sliding blocks 51 of the main loading elements 16 and 17 through links 61 in the directions of arrows a' and b'. The pairs of links 60 and 61 of link assemblies 44 and 45 are folded from the straightened state, shown in FIG. 4B, to the V-shaped folded state, shown in FIG. 4A. Therefore, the sliding blocks 51 are moved from the active positions to the inactive positions along the guide rails 34 and 35 in the directions of the arrows a' and b', respectively.

As shown in FIG. 4A, the main loading elements 16 and 17 are moved to their inactive positions and each drive pin 40 and 41 of sliding plate 32 is fitted in one end 65a of the slot 65 of a corresponding one of links 59, thereby completing the tape unloading operation.

In the drive mechanism using the sliding plate 32 for the main loading elements 16 and 17, because the pair of main loading elements 16 and 17 are reciprocated by the pair of extendible link assemblies 44 and 45 along the pair of guide rails 34 and 35 by sliding plate 32 that is reciprocated by capstan motor 22. The number of machine elements and the number of assembly steps are small, and the structure is very simple. In addition, the pair of extendible link assemblies 44 and 45 driven by sliding plate 32 are freely extendible in accordance with the phases of the pair of main loading elements 16 and 17 being reciprocated along the pair of guide rails 34 and 35. The pair of main loading elements 16 and 17 can be smoothly reciprocated along the pair of guide rails 34 and 35, and the load on the capstan motor 22 can be reduced. Because sliding plate 32 can be reciprocated below cassette 9, the distance $l_1$ between cassette 9 and rotary head drum 4 can be minimized, thereby resulting in a compact tape loading device.

A drive mechanism for subsidiary loading element 19 on the tape take-up side is shown in FIGS. 5A to 5D, in which subsidiary loading element 19 has a tape guide 69 formed by a roller. This tape guide roller 69 is rotatably mounted on a pin 70 at one end 47a of a substantially U-shaped lever 47. Lever 47 is arranged to pivot about a fulcrum pin 37 formed on main chassis 1 in the directions of arrows d and d'. In addition to sliding plate 32 constituting a driving element reciprocated by capstan motor 22 between the unloading completion position $P_1$ and the loading completion position $P_2$, there is also provided an engagement portion shown generally at 71 that can move relative to lever 47 of subsidiary loading element 19. Engagement portion 71 is formed of drive pin 42 formed on sliding plate 32 and a recess 72 formed between ends 47a and 47b of lever 47.

A contact pin 73 is arranged on lever 47 at a position opposite to tape guide roller 69 relative to fulcrum pin 37. A spring 74 formed by a torsion coil spring is fitted on a spring holding pin 75 formed on main chassis 1. A free end 74a of spring 74 abuts against contact pin 73 and a fixed end 74b thereof is fixed to main chassis 1. A stop 76 is formed on main chassis 1 at the active position of subsidiary loading device 19.

Figure 5A:
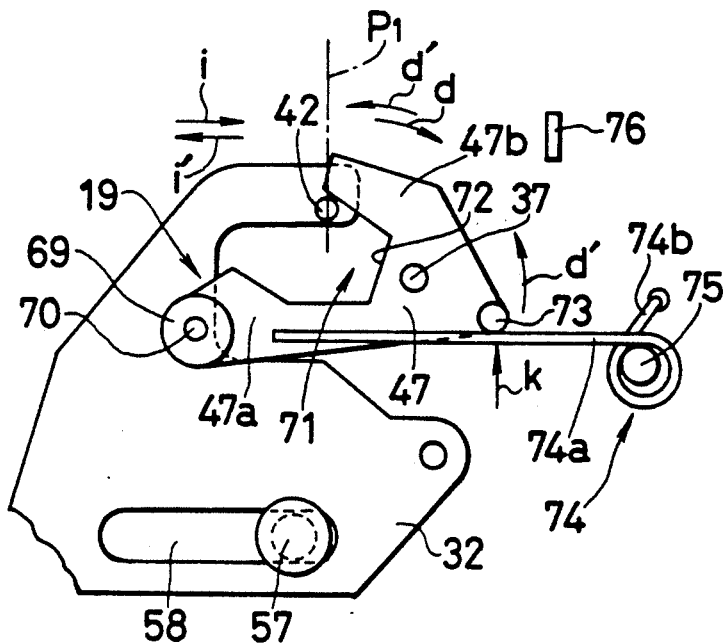
FIGS. 5A to 5D are explanatory plan views showing the drive mechanism of the subsidiary loading mechanism provided on the take-up side of the tape loading device of FIG. 1 in different stages of operation, respectively.

The operation of the above-described mechanism will be described relative to FIGS. 5A-5D, in which FIG. 5A shows a tape unloading state. In this state, drive pin 42 of sliding plate 32 is located at the unloading completion position $P_1$. Lever 47 is biased to pivot about fulcrum pin 37 in the return direction of arrow d' by the free end 74a of spring 74 that urges contact pin 73 in the direction of arrow k. The other end 47b of lever 47 is urged against drive pin 42 from the direction of arrow d', so that tape guide roller 69 of subsidiary loading element 1 is located in its inactive position.

Figure 5B:
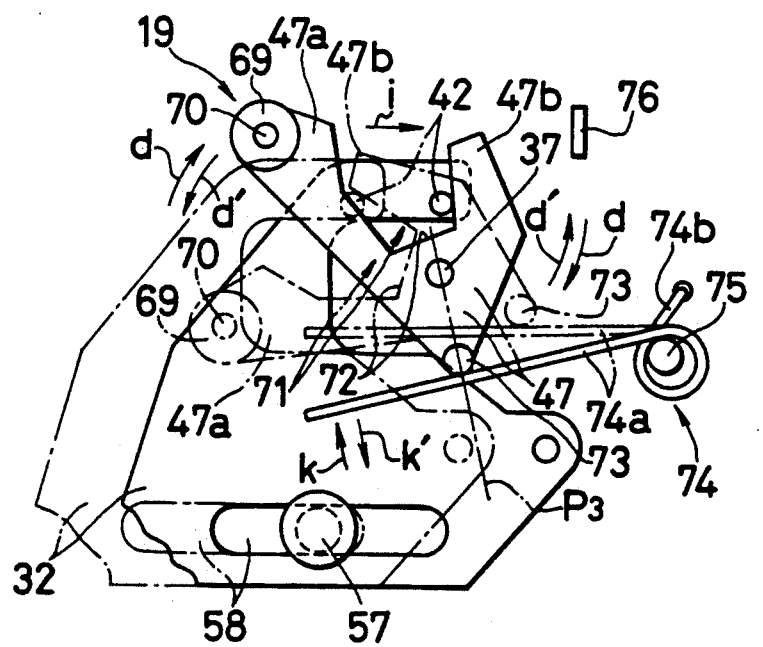
Figure 5C:
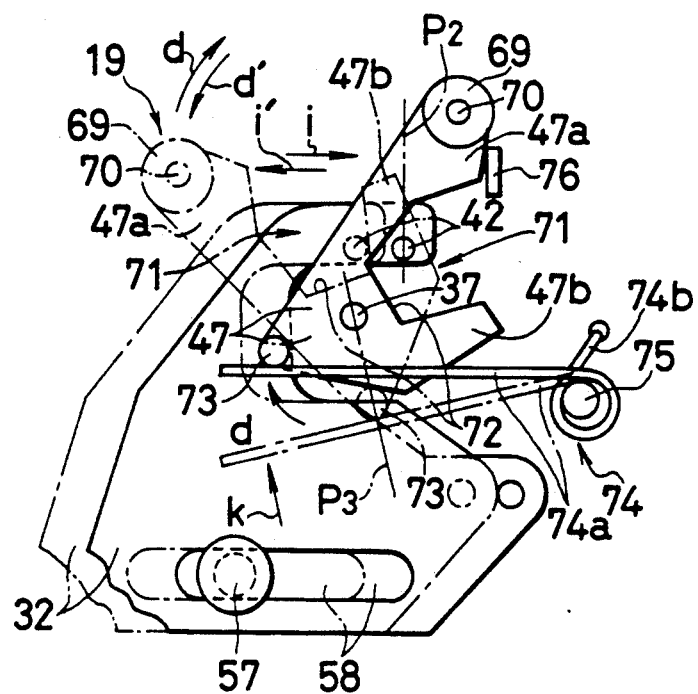

At the time of tape loading, drive pin 42 of sliding plate 32 is slid from the unloading completion position $P_1$ of FIG. 5A to the loading position $P_2$ of FIG. 5C in the direction of arrow i. Drive pin 42 then urges the other end 47b of lever 47 in the direction of arrow d. Lever 47 is pivoted about fulcrum pin 37 in the direction of arrow d, and tape guide roller 69 of subsidiary loading element 19 is pivoted from the inactive position of FIG. 5A to the active position of FIG. 5C in the direction of arrow d.

In this case, as shown in FIG. 5B, contact pin 73 that is pivoted together with lever 47 in the direction of arrow d urges the free end 74a of spring 74 in a direction indicated by arrow k'. As soon as contact pin 73 passes over dead center, that is, a position where a line connecting the centers of fulcrum pin 37 and contact pin 73 is perpendicular to free end 74a of spring 74, as shown at $P_3$, a pivotal force in the direction of arrow d acts on contact pin 73 by the free end 74a of spring 74 which urges contact pin 73 from the direction of an arrow k, as shown in FIG. 5C.

More specifically, as soon as lever 47 passes dead center $P_3$ in the direction of arrow d, the pivoting/biasing direction of lever 47 by the free end 74a of spring 74 is changed, so that the free end 74a of spring 74 urges lever 47 in the direction of arrow d, opposite to the direction of FIG. 5A.

As shown in FIG. 5C, lever 47 is pivoted by the free end 74a of spring 74 in the direction of arrow d and upon pivotal movement of tape guide roller 69 to the active position, lever 47 is urged against stop 76 by the free end 74a of spring 74, thereby completing the tape loading operation. In this case, drive pin 42 of sliding plate 32 is separated from end 47b of lever 47 and is moved in a direction to come relatively close to the other end 47a. The take-up side 10b of magnetic tape 10 is pulled from cassette 9 by tape guide roller 69 of subsidiary loading device 19 and is passed against tape guide 6 and capstan 7, as shown in FIG. 1.

At the time of tape unloading, as previously described, drive pin 42 of sliding plate 32 is slid from the loading completion position $P_2$ of FIG. 5C to the unloading completion position $P_1$ of FIG. 5A in the direction of arrow i', and drive pin 42 urges one end 47a of lever 47 in the direction of the arrow d'. Lever 47 is pivoted about fulcrum pin 37 in the direction of arrow d', and tape guide roller 69 of subsidiary loading element 19 is pivoted from the inactive position of FIG. 5C to the active position of FIG. 5A in the direction of arrow d'.

Figure 5D:
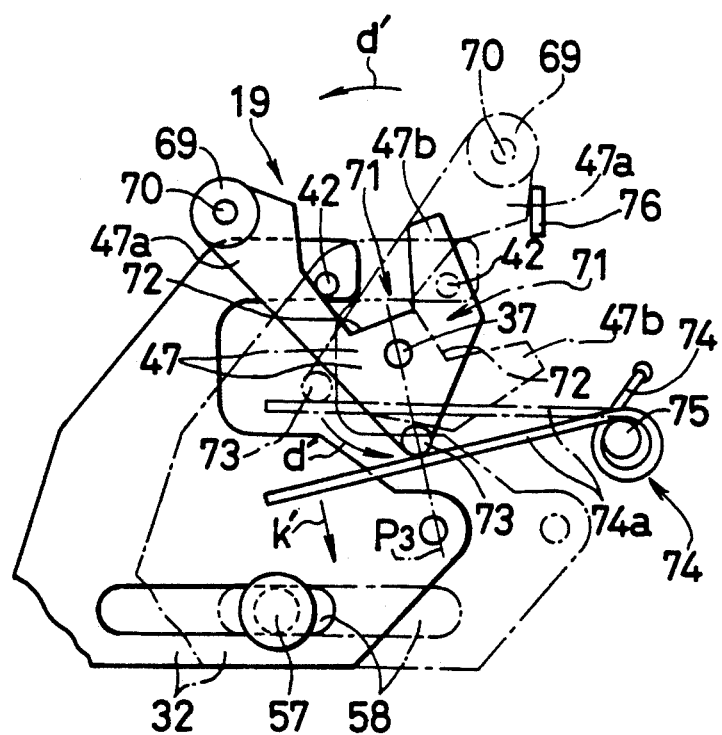

In this case, as shown in FIG. 5D, contact pin 73 is pivoted together with lever 47 in the direction of the arrow d and urges the free end 74a of spring 74 in the direction of arrow k'. As soon as contact pin 73 passes over dead center $P_3$ of the free end 74a of spring 74 in the direction of arrow d', a pivotal force in the direction of arrow d' is applied to contact pin 73 from the free end 74a of spring 74. More specifically, as soon as lever 47 passes over dead center $P_3$ in the direction of arrow d', the pivoting/biasing direction of lever 47 by the free end 74a of spring 74 is switched, so that the free end 74a of spring 74 pivots and biases lever 47 in the direction of arrow d', opposite to that of FIG. 5C.

As shown in FIG. 5A, when lever 47 is pivoted by the free end 74a of spring 74 in the direction of arrow d' and tape guide 69 roller is pivoted to the inactive position, one end 47a of lever 47 is brought into contact with drive pin 42 of sliding plate 32 from the direction of arrow d', thereby completing the tape unloading operation.

In the drive mechanism for subsidiary loading device 19 described above, the pivoting/biasing directions, arrows d and d', caused by spring 74 with respect to the pivot fulcrum pin 37 can be automatically reversed during reciprocal driving of subsidiary loading element 19 by sliding plate 32 acting as a drive element. Subsidiary loading element 19 abuts against and is positioned by stop 76 by means of spring 74 in the active position. On the other band, subsidiary loading element 19 when in the inactive position need not be urged against stop 76 due to the high power of capstan motor 22.

Because of this arrangement, a limiting mechanism for absorbing a stroke difference between drive pin 42 and lever 4 and urging subsidiary loading element 19 against stop 76 need not be provided adjacent fulcrum pin 37, thereby simplifying the overall drive mechanism. In addition, no load acts on capstan motor 22 when subsidiary loading element 19 is urged against stop 76, therefore, capstan motor 22 can be made more compact. Note that a load generated when main loading elements 16 and 17, shown in FIG. 4A and 4B, are urged against stop 66 is applied to capstan motor 22.

A drive mechanism for subsidiary loading element 18 located on the tape supply side is shown in FIGS. 6A to 6D, in which subsidiary loading element 18 comprises a tape guide roller 78 rotatably mounted on one end 46a of a substantially U-shaped lever 46 through a pin 79. Lever 46 is rotatably pivoted in directions c and c' about fulcrum pin 36 mounted on main chassis 1. An engagement portion 80 in lever 46 for permitting relative motion is formed between main loading element 16 at the tape supply side, which constitutes the driving means reciprocated by capstan motor 22 between the active and inactive positions, and lever 46 of subsidiary loading element 18. This engagement portion 80 comprises sliding block 51, tape guide roller 52 and a recess 81 formed between ends 46a and 46b of lever 46.

A contact pin 82 is arranged between tape guide 78 and fulcrum pin 36 on one end 46a of lever 46. A spring 83 constituted by a torsion coil spring is mounted on a spring holding pin 84 formed on main chassis 1. A free end 83a of this spring 83 is brought into contact with contact pin 82, and the other end 83b of spring 83 is fixed to main chassis 1. A stop 85 is formed on main chassis 1 at the active position of subsidiary loading element 18.

Figure 6A:
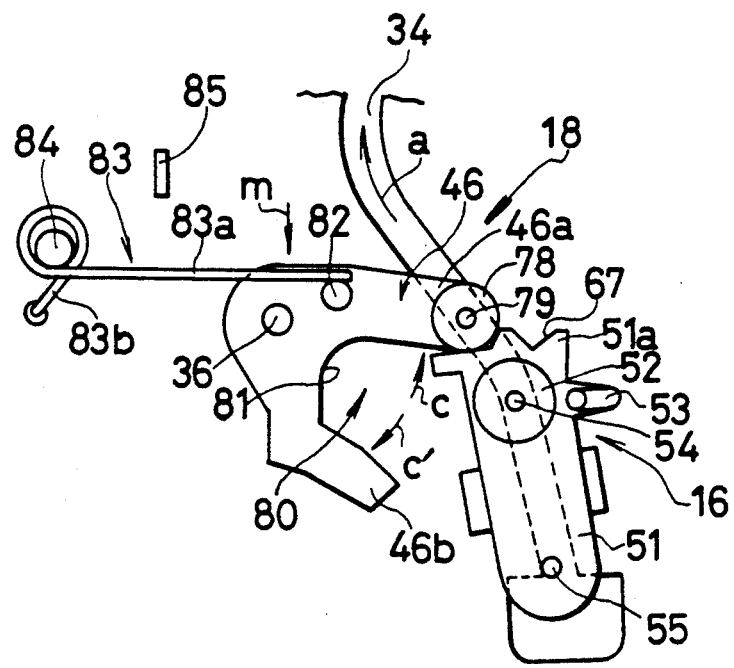
FIGS. 6A to 6D are explanatory plan views showing the drive mechanism of another subsidiary loading mechanism provided o the supply side of the tape loading device of FIG. 1 in different stages of operation, respectively.

The operation of this mechanism will be described in regard to FIGS. 6A–6D, in which FIG. 6A shows a tape unloading state and in which main loading element 16 is located at its inactive position. Lever 46 is pivoted about fulcrum pin 36 in the direction of arrow c' by the free end 83a of spring 83 which urges contact pin 82 from the direction of arrow m. One end 46a of lever 46 abuts against a front part 51a of sliding block 51, and tape guide roller 78 of subsidiary loading element 18 is returned to the inactive position.

Figure 6B:
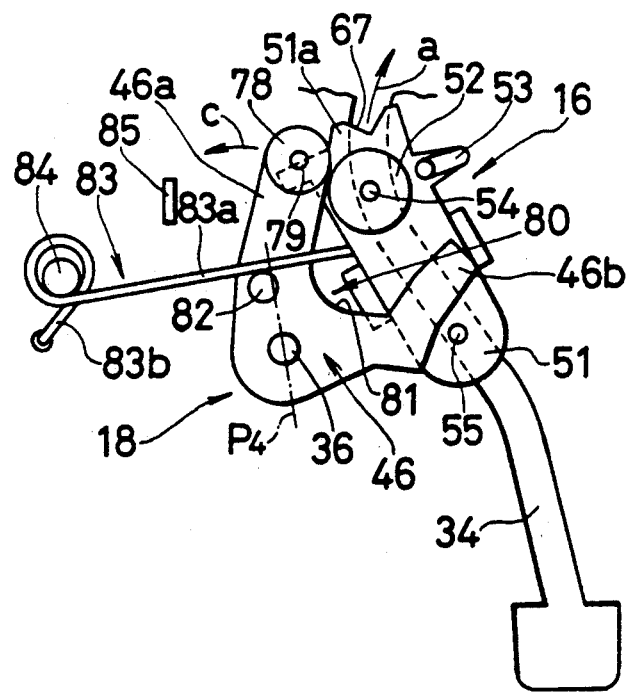

Upon tape loading, as shown in FIG. 6B, the sliding block 51 is slid along the guide rail 34 in the direction of arrow a and lever 46 is pivoted against the spring 83 in the direction of the arrow c by the front part 51a of sliding block 51. As soon as contact pin 82 passes over dead center, which is the position $P_4$ where a line connecting the centers of fulcrum pin 36 and contact pin 82 is perpendicular to the free end 83a of spring 83, a pivotal force acts on contact pin 82 in the direction of arrow c by free end 83a of spring 83 for urging contact pin 82 from the direction of arrow m, as shown in FIG. 6C.

Figure 6C:
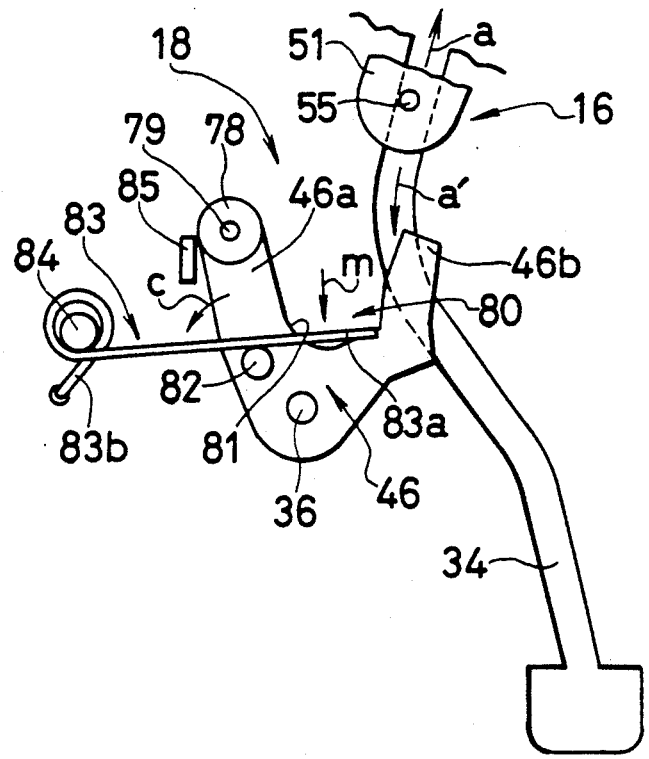

In FIG. 6C, spring 83 is pivoted by free end 83a in the direction of arrow c as described above. When tape guide roller 78 is pivoted to the active position, lever 46 is urged against stop 85 by free end 83a of spring 83, thereby completing the tape loading operation. During this operation, sliding block 51 is separated from level 46 and is moved to the active position along the guide rail 34 in the direction of arrow a. As shown in FIG. 1, supply side 10a of magnetic tape 10 is pulled from cassette 9 by tape guide roller 78 of subsidiary loading device 18 and is passed against tension detecting pin 5.

Figure 6D:
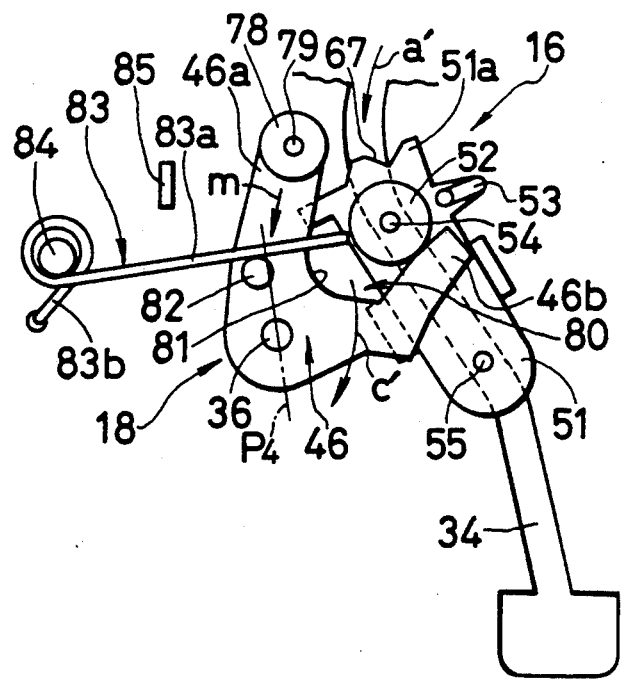

At the time of tape unloading, as shown in FIG. 6C, sliding block 51 is slid along guide rail 34 in the direction of arrow a'. As shown in FIG. 6D, the proximal portion of tape guide 52 on sliding block 51 abuts the other end 46b of lever 46 from the direction of arrow a', so that lever 46 is pivoted against spring 83 in the direction of arrow c'. As soon as the contact pin 82 passes over the dead center $P_4$ of free end 83a of spring 83 in the direction of arrow c', a pivotal force in the direction of arrow c' is applied to contact pin 82 by the free end 83a of spring 83 that urges contact pin 82 from the direction of arrow m, as shown in FIG. 6A.

As shown in FIG. 6A, lever 46 is then pivoted by free end 83a of spring 83 in the direction of arrow c', and one end 46a of lever 46 is brought into contact with front part 51a. Tape guide 78 is moved together with end 46a to the inactive position, thereby completing the tape unloading operation. The drive mechanism for subsidiary loading device 18 is the same as that for subsidiary loading device 19, shown in FIGS. 5A to 5D.

Figure 7A:
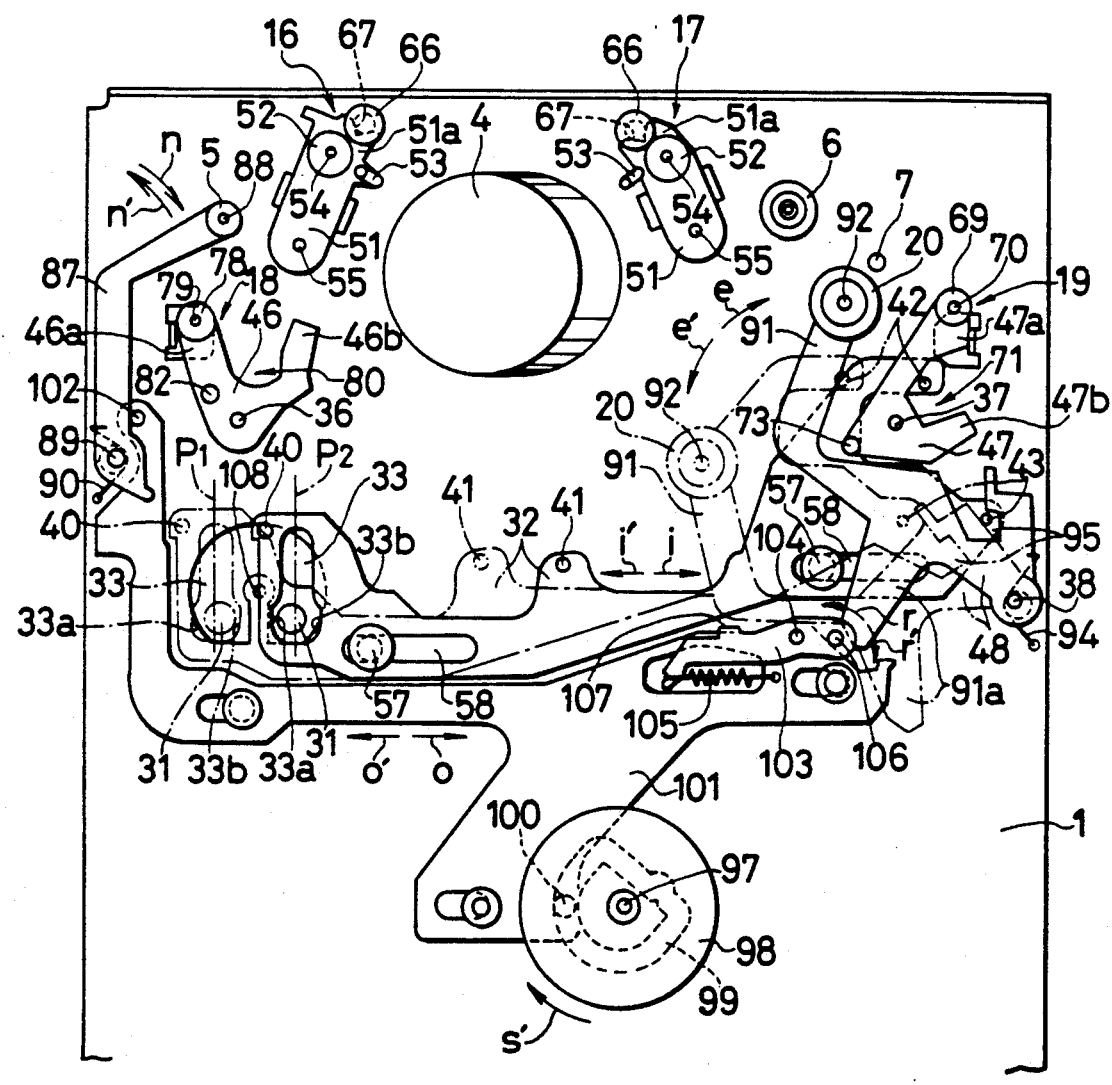
FIGS. 7A and 7B are explanatory plan views showing the drive mechanisms of a tension detecting pin and pinch roller incorporated in the tape loading device of FIG. 1 in different stages of operation, respectively.
Figure 7B:
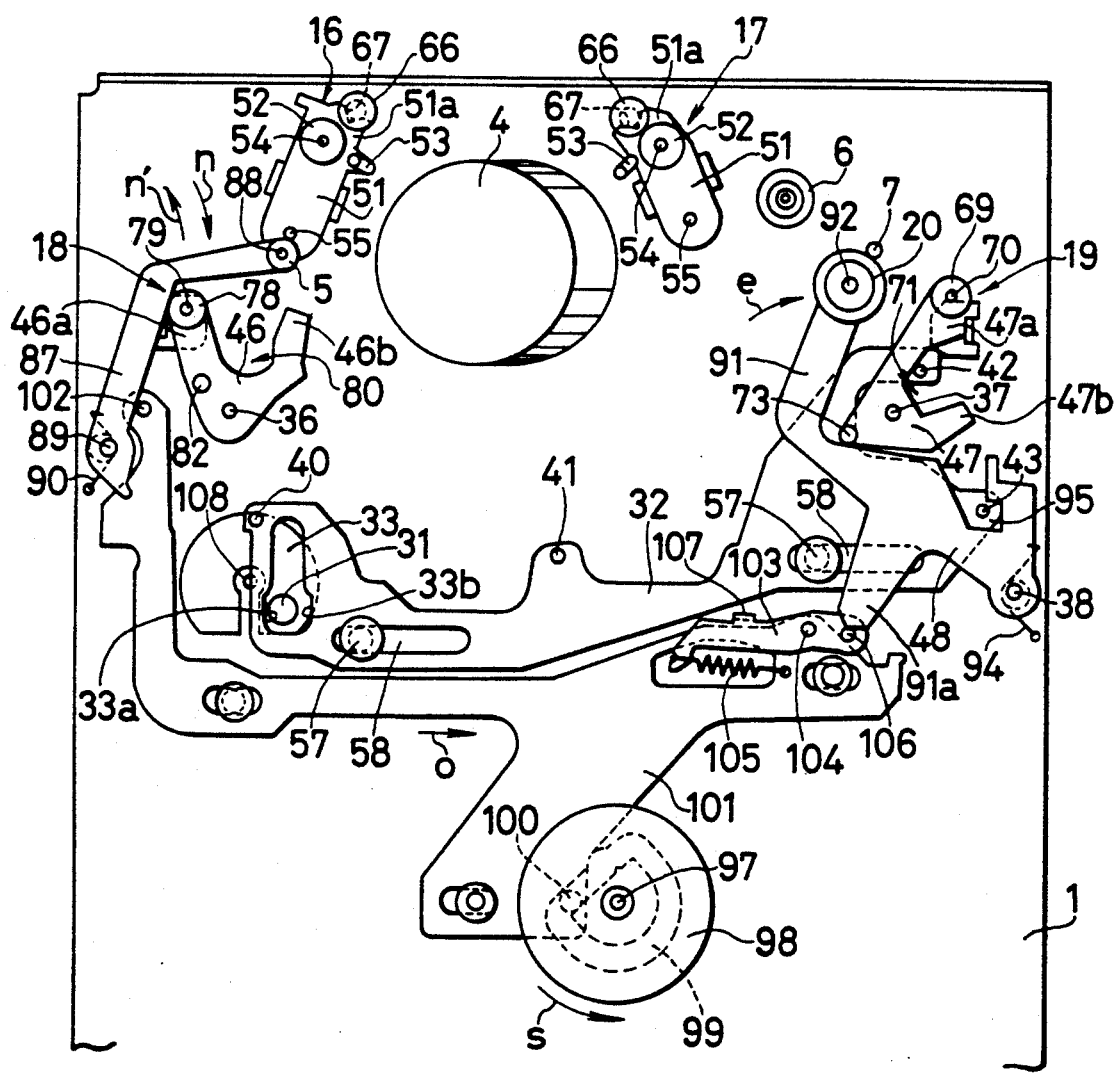

A drive mechanism for tension detecting pin 6 and pinch roller 20 is shown in FIGS. 7A and 7B, in which tension detecting pin 5 comprises a roller and is rotatably mounted at the distal end of a tension detecting lever 87 through a pin 88. Tension detecting lever 87 is pivoted in directions n and n' about a fulcrum pin 89 formed on main chassis 1. Tension detecting lever 87 is biased in direction n by a spring 90 consisting of a torsion coil spring.

Pinch roller 20 is rotatably mounted on the distal end of a pinch-roller holding lever 91 through a pin 92. Pinch-roller holding lever 91 is pivoted in directions e and e' about fulcrum pin 38 formed on main chassis 1 and is biased by a spring 94 consisting of a torsion coil spring in the direction of arrow e'. Drive pin 43 formed on sliding plate 32 can be engaged with and disengaged from an engagement portion 95 formed as a recess in pinch-roller holding lever 91 in the directions of arrows i and i'.

A cam gear 98 is rotated through a cam shaft 97 together with cam gear 27 that is rotated by mode motor 25 and cam gear 98 is mounted on main chassis 1. A stop/forward sliding plate 101 is slidably driven by a cam groove 99 of cam gear 98 through a cam follower 100 in the directions indicated by arrows o and o' and sliding plate 101 is also mounted on main chassis 1. Tape tension detecting lever 87 is moved into contact from the direction n with a pin 102 formed on one end of sliding plate 101. A flat element 103 is mounted on the other end of sliding plate 101 so as to be rotatable in directions r and r' about a pivot 104 and is biased by a limiting spring 105 in the direction of arrow r and abuts against the side surface of sliding plate 101 by means of a stop 107. A drive pin 106 is mounted on the distal end of flat element 103 to engage or disengage an arm 91a of pinch-roller holding lever 91 from the directions of arrows o and o', respectively.

In the operation of this mechanism, FIG. 7A shows the tape loading completion state, in which when sliding plate 32 is slid in direction i from the unloading completion position $P_1$ to the loading position $P_2$, drive pin 43 is engaged with the engagement portion 95 of pinch-roller holding lever 91. Pinch-roller holding lever 91 and pinch roller 20 are pivoted from the inactive positions shown by the dot-dash lines to the active positions shown by solid lines against the force of spring 94.

FIG. 7B shows the recording/reproducing mode, in which by means of cam groove 99 of cam gear 98 being rotated by mode motor 25 in the forward direction, sliding plate 101 is slid in direction o from the stop position of FIG. 7A to the forward position of FIG. 7B through cam follower 100. Tension detecting lever 87, which is in contact with pin 102, is pivoted by spring 90 in the direction of arrow n. Tension detection pin 5 is urged against the supply side 10a of magnetic tape 10 by spring 90, as indicated by the solid line in FIG. 1.

At the same time, drive pin 106 of flat element 103 is urged in direction o against arm 91a of pinch-roller holding lever 91 against the force of limiting spring 105. Pinch-roller holding lever 91 is further pivoted in the direction of arrow d, and pinch roller 20 brings the take-up side 10b of magnetic tape 10 into contact with capstan 7, as indicated by the dot and dashed line in FIG. 1. In this case, drive pin 43 resides loosely in engagement portion 95.

In the recording/reproducing mode, tension detecting pin 5 is pivoted against spring 90 in the direction of arrow n or n' in FIG. 7B, in accordance with a change in tension of magnetic tape 10. Tension detecting lever 87 controls a soft brake (not shown) of supply reel base 2 shown in FIG. 1, thereby controlling the back tension of magnetic tape 10 to be held constant.

When the mode is changed to a stop mode, sliding plate 101 is slid in the direction of arrow o' to the stop position by cam gear 98 rotating in the reverse direction, that is, in direction s' shown in FIG. 7A. Drive pin 106 of flat element 103 is separated from arm 91a of pinch-roller holding lever 91 in the direction of the arrow o', and pinch-roller holding lever 91 and pinch roller 20 are returned in direction d' to the positions shown by solid lines in FIG. 7A.

Figure 8A:
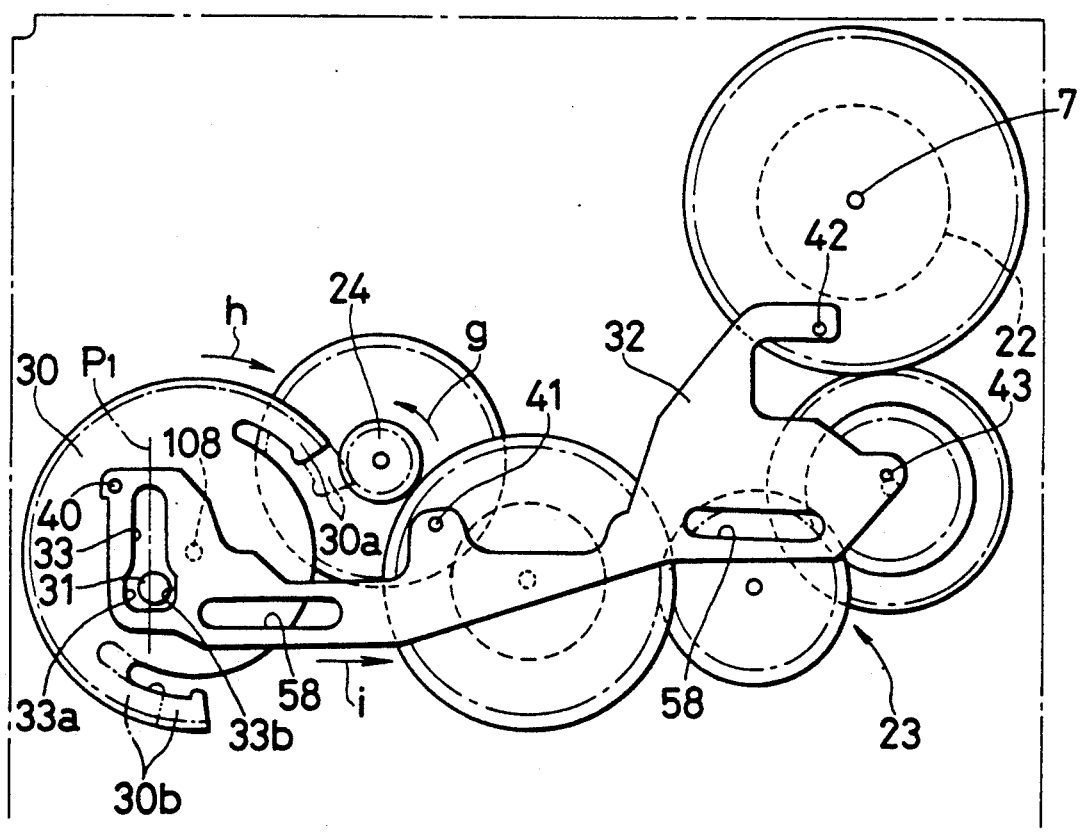
FIGS. 8A and 8B are explanatory plan views showing the drive mechanism of a sliding plate incorporated in the tape loading device of FIG. 1 in different stages of operation, respectively.
Figure 8B:
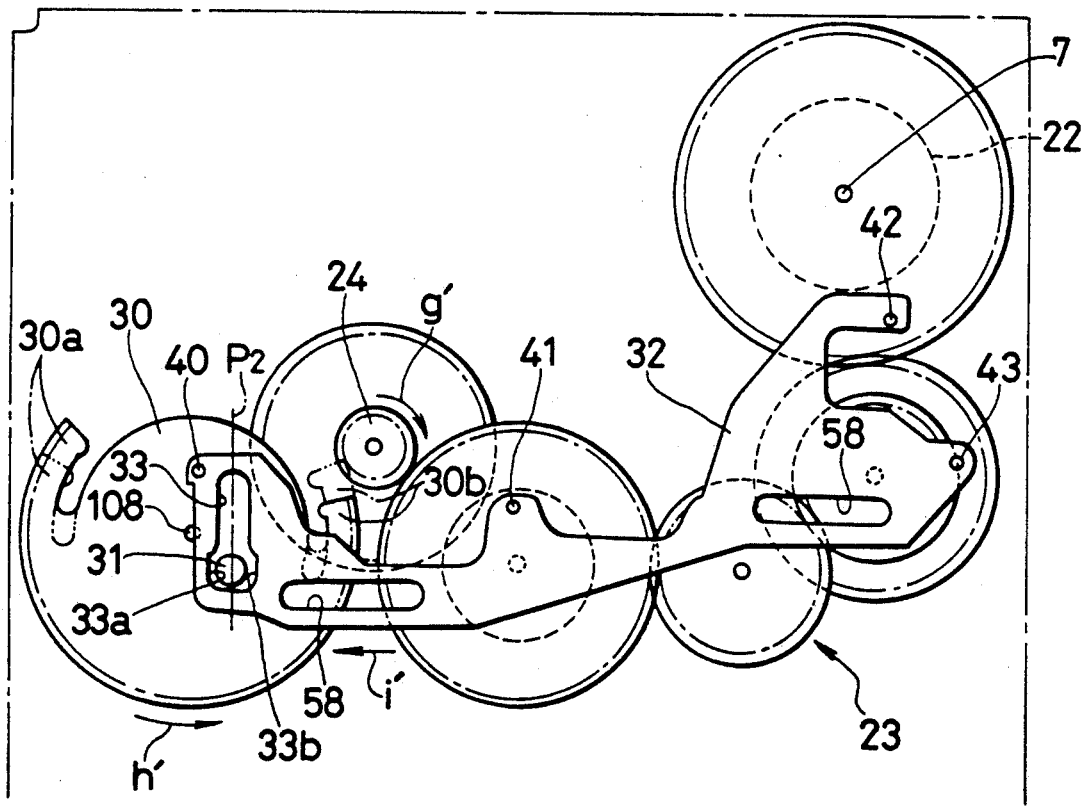

A drive mechanism for sliding plate 32 is shown in FIGS. 8A and 8B, in which capstan motor 22 rotates in the forward direction in response to a loading command signal, and drive gear 24 is rotated in the forward direction through gear train 23. When the partially toothless gear 30 is rotated from the position shown by solid lines to the position shown by dot and dash lines in direction h, one end 30a of partially toothless gear 30 meshes with drive gear 24, thereby setting a loading mode.

Meanwhile, drive pin 31 extending from partially toothless gear 30 is pivoted along a meshing clearance part 33a formed at the side of one end of elongate hole 33 in sliding plate 32 in the direction of arrow h and is then inserted into elongate hole 33.

Upon a meshing between the teeth partially toothless gear 30 and drive gear 24, partially toothless gear 30 is rotated through about 250° by drive gear 24 in the direction of arrow h. By an angular displacement of about 180°, sliding plate 32 is slid by drive pin 31 from the unloading completion position $P_1$ of FIG. 8A to the loading completion position $P_2$ of FIG. 8B through elongate hole 33 in the direction of the arrow i. Following this rotation, partially toothless gear 30 is disengaged from drive gear 24 and is then stopped in this separated state, as shown in FIG. 8B.

At the time of tape unloading, capstan motor 22 rotates in the reverse direction in response to an unloading command signal to rotate drive gear 24 through gear train 23 in the reverse direction indicated by arrow g', as shown in FIG. 8B. When partially toothless gear 30 is rotated from the position shown by solid lines to the position shown by dot and dashed line in the direction of arrow h', the other end 30b of partially toothless gear 30 is meshed with drive gear 24, thereby setting an unloading mode.

Meanwhile, drive pin 31 extending from partially toothless gear 30 is pivoted in direction h' along a meshing clearance part 33b formed at the other side of one end portion of elongate hole 33 in sliding plate 32 and is then inserted into elongate hole 33.

Upon meshing between partially toothless gear 30 and drive gear 24, partially toothless gear 30 is rotated through about 250° in the direction of arrow h'. Sliding plate 32 is slid in direction i from the loading completion position $P_2$ of FIG. 8B to the unloading completion position $P_1$ of FIG. 8A during rotation through about 180°. Upon the above rotation, partially toothless gear 30 is disengaged from drive gear 24 and is then stopped in this separated state, as shown in FIG. 8B.

Figure 9A:
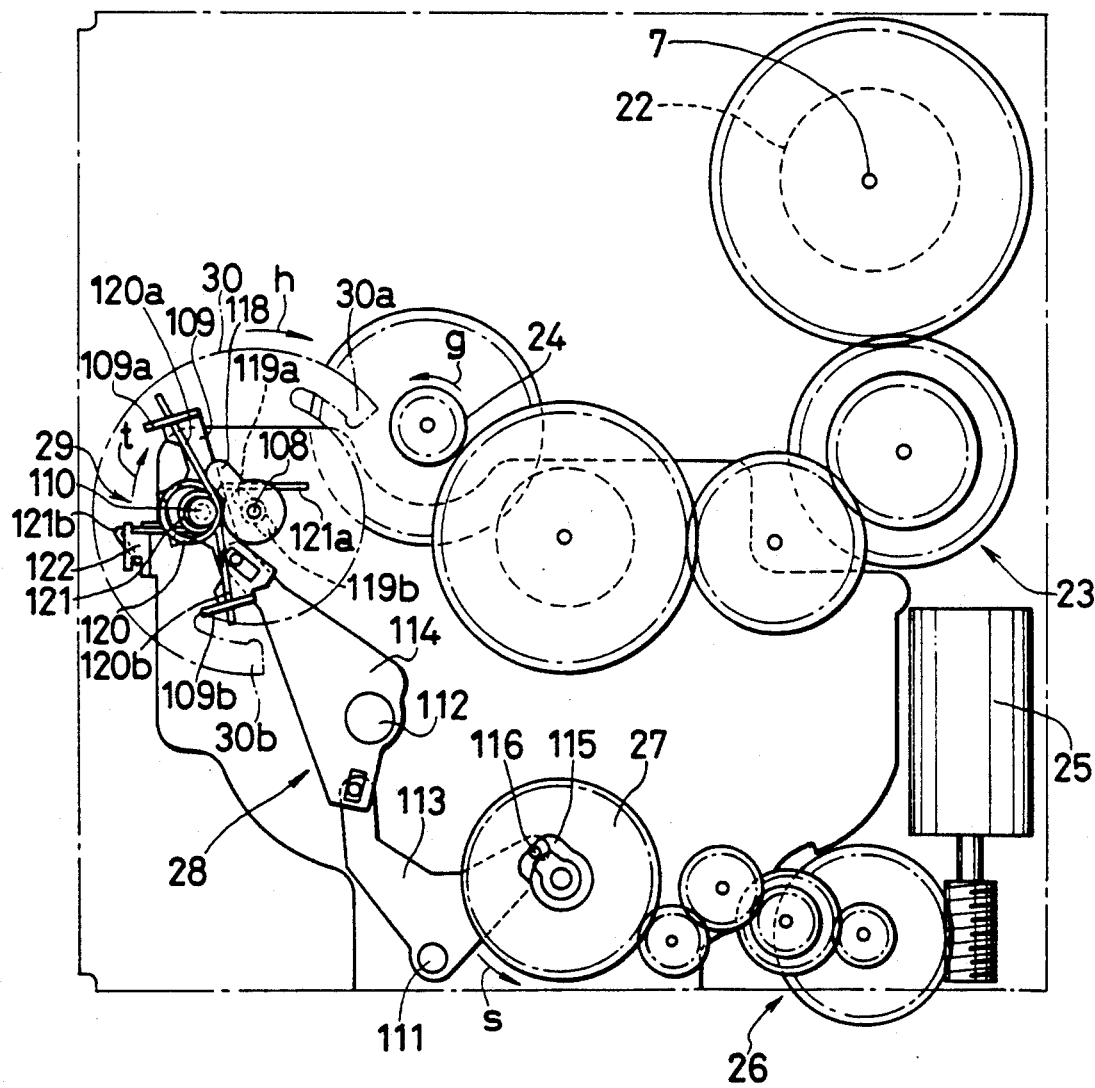
FIGS. 9A and 9B are schematic plan views showing a triggering mechanism incorporated in the tape loading device of FIG. 1 in different stages of operation, respectively.
Figure 9B:
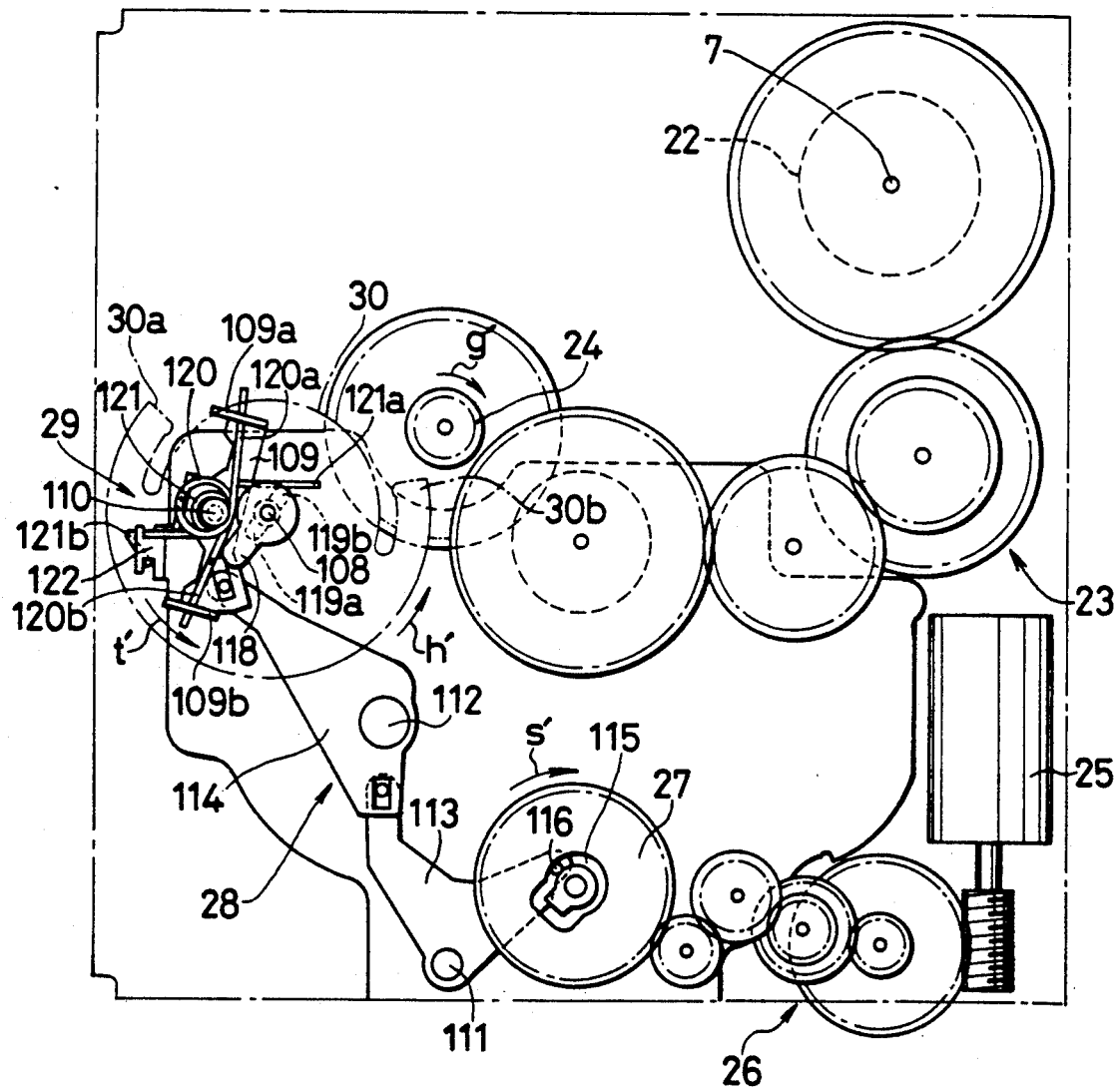

The triggering mechanism 29 is shown in FIGS. 9A and 9B, in which triggering lever 109 is located near a pivot 108 of partially toothless gear 30. Triggering lever 109 is swingable about a pivot 110 in directions indicated by arrows t and t' and link assembly 28 is constituted by a pair of links 113 and 114, each swingable about respective fulcrum pins 111 and 112 and being connected to each other. A cam follower 116 is engaged with a cam groove 115 formed in cam gear 27 and is formed on one link 113, with the other link 114 being connected to the triggering lever 109.

When mode motor 25 rotates in the forward direction in response to a loading command signal and cam gear 27 is rotated through gear train 26 in the forward direction s, triggering lever 109 is swung in the direction of arrow t through link assembly 28. Partially toothless gear 30 is rotated by a mechanical triggering operation by triggering lever 109 in the direction of arrow h, and one end 30a of partially toothless gear 30 is meshed with drive gear 24 rotated in the direction of the arrow g, thereby setting the loading mode.

At the time of tape unloading the mode motor rotates in the reverse direction in response to an unloading command signal, and cam gear 27 is rotated through gear train 26 in the reverse direction, indicated by arrow s' in FIG. 9B. Triggering lever 109 is swung through line assembly 28 in the direction of arrow t', and partially toothless gear 30 is rotated by a mechanical triggering operation of triggering lever 109 in the direction of arrow h'. From the direction of arrow h', the other end 30b of partially toothless gear 30 is meshed with drive gear 24 driven in the direction of arrow g', thereby setting the unloading mode.

Figure 10B:
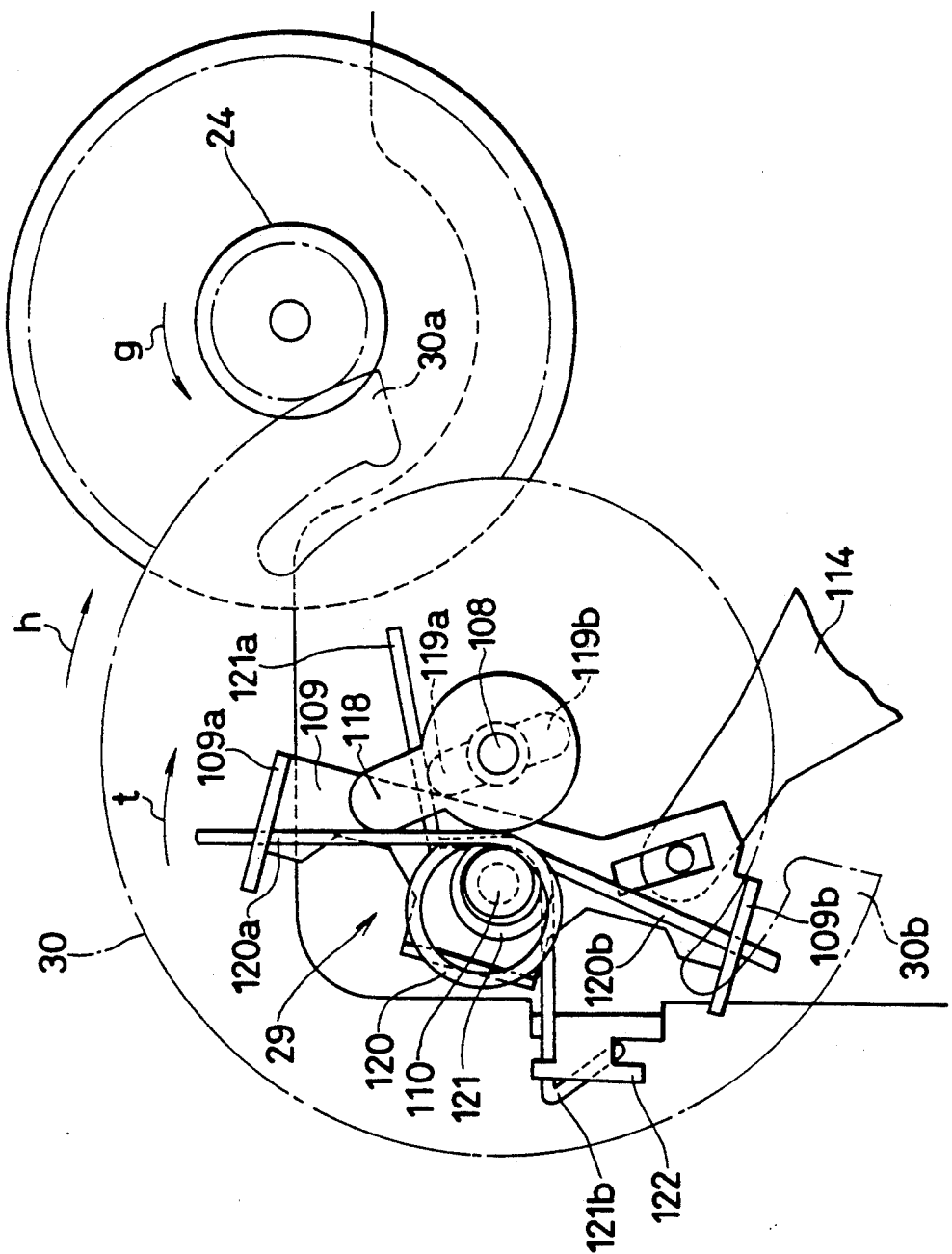
Figure 10D:
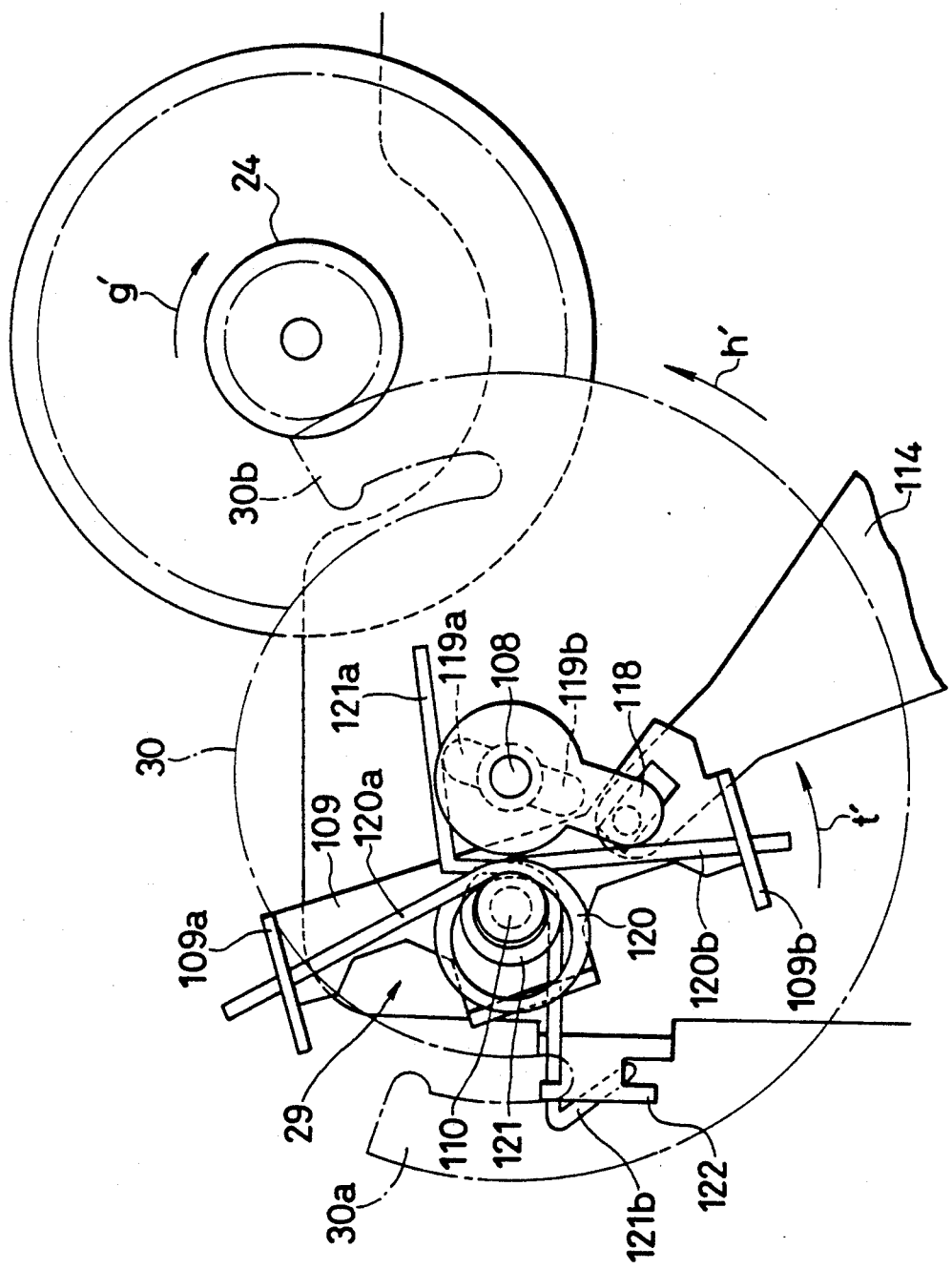
Figure 11:
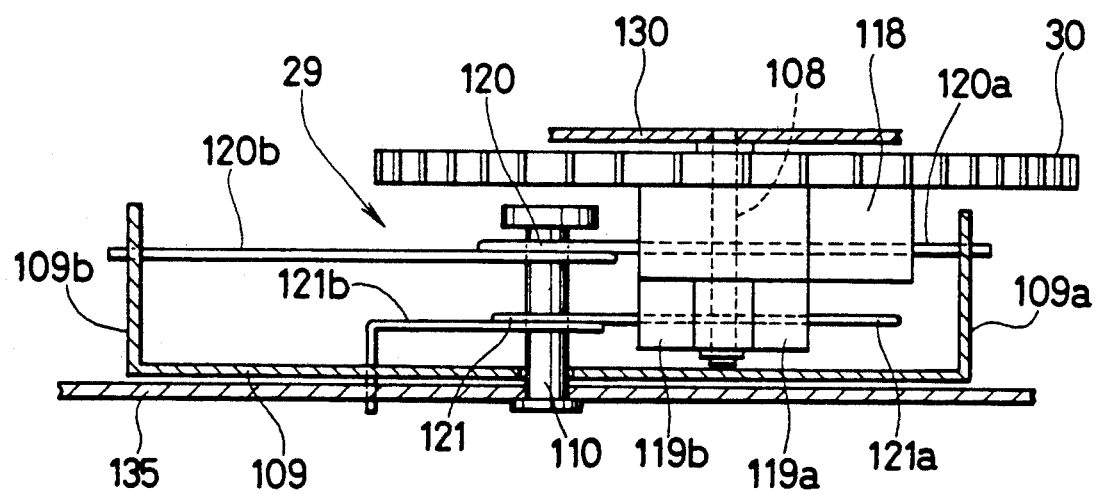
FIG. 11 is an elevational view of the triggering mechanism shown in FIGS. 10A to 10D.

Triggering mechanism 29 is shown in FIGS. 10A to 11, in which a single projection 118 and paired positioning projections 119a and 119b are integrally formed as a vertical double step structure on the lower surface of partially toothless gear 30 which corresponds to the outer surface of pivot 108. A triggering spring 120 that is formed as a torsion coil spring and a positioning spring 121 are both horizontally mounted on the pivot 110 of triggering lever 109. The straight ends 120a and 120b of spring 120 are hooked between the two end portions 109a and 109b, respectively, of the triggering lever 109. Ends 120a and 120b are arranged to alternately push the single projection 118. A free end 121a of positioning spring 121 is formed to alternately push the paired positioning projections 119a and 119b and the other end 121b of positioning spring 121 is locked by a spring anchor 122 of triggering lever 109.

In the operation of triggering mechanism 29 in the unloading state shown in FIG. 10A, free end 121a of positioning spring 121 presses against and follows projection 119a in a direction indicated by arrow u and the single projection 118 urges the straight end 120a of triggering spring 120 in the direction of arrow h'. As a result, partially toothless gear 30 is biased in the direction of arrow h', and one end 30a of partially toothless gear 30 is kept separated from the drive gear 24.

In this unloading state, as shown in FIG. 10B, when triggering lever 109 is swung in the direction of arrow t, the straight end 120a of triggering spring 120 urges the single projection 118 in the direction of the arrow t. Partially toothless gear 30 is then biased and rotated in the direction of arrow h, so that one end 30a of the partially toothless gear 30 is meshed with the rotating drive gear 24 and is rotated in the direction of arrow g, thereby performing a mechanical triggering operation. Thereafter, partially toothless gear 30 is rotated through about 250° by drive gear 24 in the direction of arrow h and partially toothless gear 30 is disengaged from drive gear 24 and is stopped in the loading state shown in FIG. 10C.

In this loading state shown in FIG. 10C, the free end 121a of positioning spring 121 abuts and moves with projection 119b in the direction of arrow u, and the single projection 118 is urged by the straight end 120b of spring 120 in the direction of arrow h. As a result, partially toothless gear 30 is rotated and biased in the direction of arrow h, and the other end 30b of partially toothless gear 30 is kept separated from drive gear 24.

In FIG. 10D, the unloading state is shown in which when triggering lever 109 is swung in the direction of arrow t', the straight end 120b of spring 120 elastically urges the single projection 118 also in the direction of arrow t'.

Partially toothless gear 30 is then biased and rotated in the direction of arrow h', and the other end 30b of partially toothless gear 30 is meshed with drive gear 24, which is rotating in the direction of arrow g', thereby performing a mechanical triggering operation. Partially toothless gear 30 is then rotated and driven through about 250° by drive gear 24 in the direction of arrow h'. As shown in FIG. 10A, partially toothless gear 30 becomes separated from drive gear 24, which restores the unloading state, and partially toothless gear 30 is then stopped.

In the triggering mechanism 29 described above, partially toothless gear 30 can be alternately and elastically rotated and biased in the forward and reverse directions, h and h', through the pair of straight ends 120a and 120b upon forward and reverse motions, t and t, of triggering lever 109, and both ends 30a and 30b of partially toothless gear 30 are elastically meshed with rotating drive gear 24 from the forward and reverse directions, h and h'. When both ends 30a and 30b of partially toothless gear 30 are to be alternately meshed with drive gear 24, the impact caused by the collision between the teeth of the respective gears can be damped by the resiliency of the pair of straight ends 120a and 120b of torsion coil spring 120. Thus, damage to the teeth of partially toothless gear 30 and drive gear 24 can be prevented. The partially toothless gear 30 can always be smoothly meshed with drive gear 24, and the triggering operation for loading or unloading magnetic tape 10 can always be and smoothly performed in a stable manner. Also, the pair of straight ends 120a and 120b formed at both ends of a single spring 120 are extended between ends 109a and 109b of lever 109, thereby resulting in a relatively simple construction.

Figure 12:
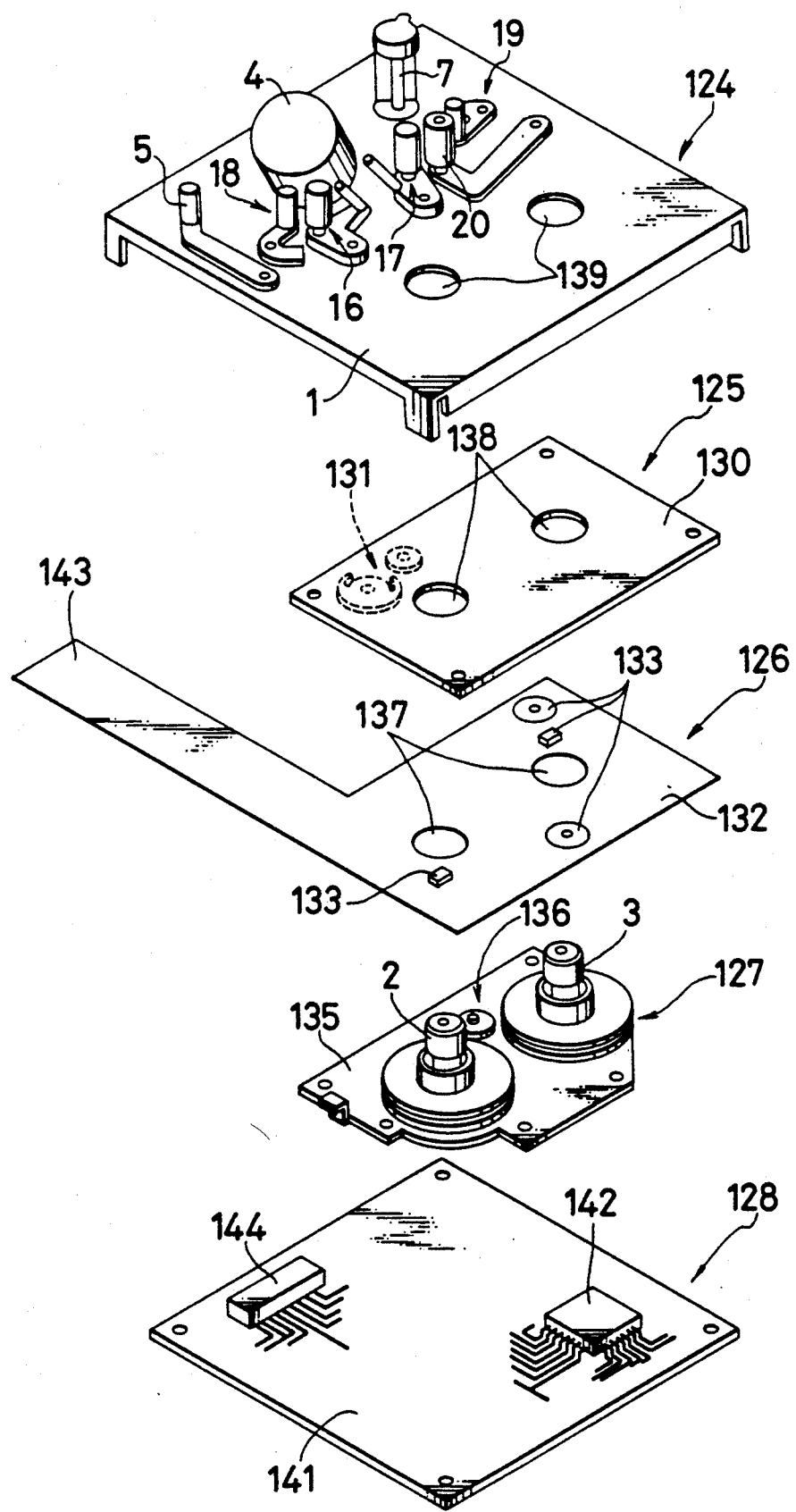
FIG. 12 is an exploded perspective view of the tape loading device, of FIG. 1.
Figure 13:
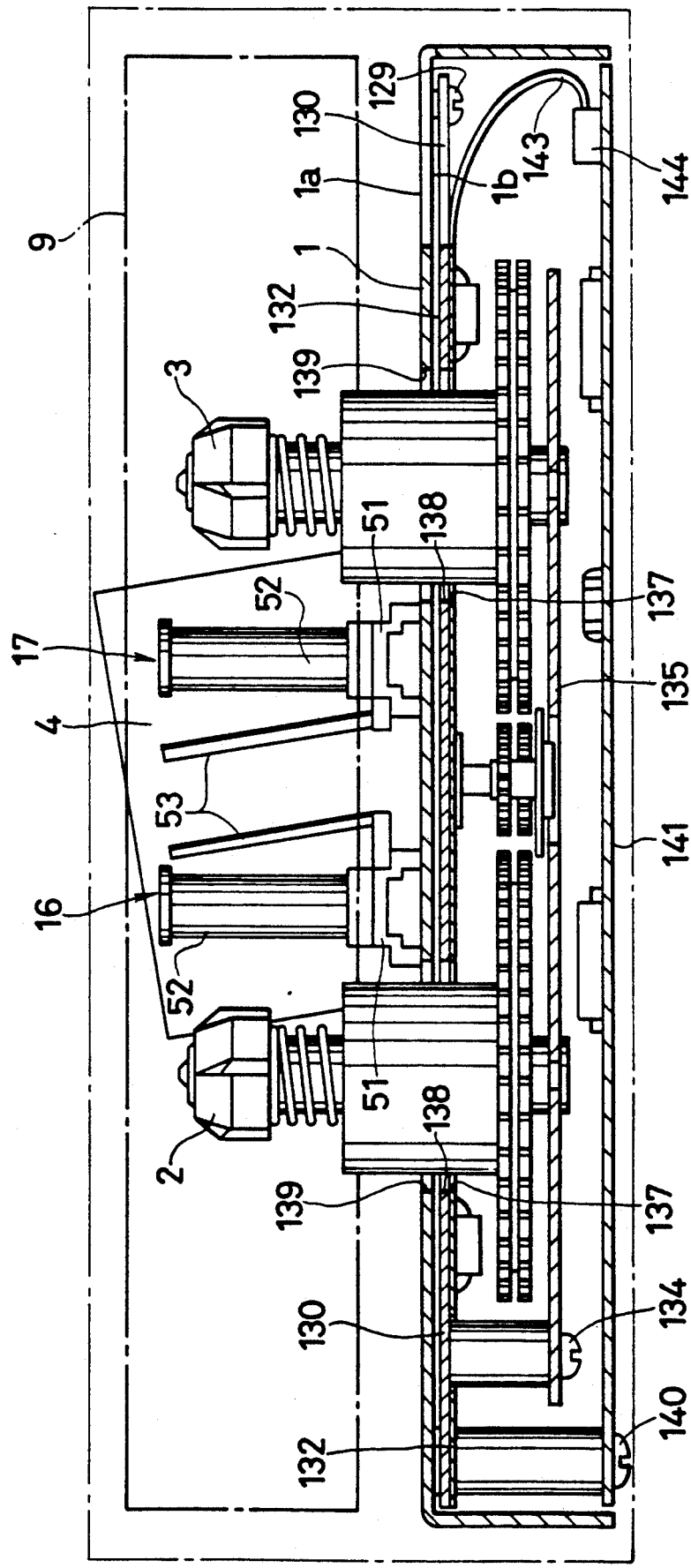
FIG. 13 is a cross-sectional, elevational view of the tape loading device of FIG. 12.

In FIGS. 12 and 13, a first subassembly 124 is provided that defines a tape travel path constituted by rotary head drum 4, tension detecting pin 5, the tape guides, and capstan 7, all of which are arranged on main chassis 1. This first subassembly 124 also includes main loading elements 16 and 17, subsidiary loading elements 18 and 19, and pinch roller 20, all of which are also arranged on main chassis 1.

As shown in FIG. 13, a second subassembly 125 is constituted by mounting a loading-system drive mechanism 131 on a lower portion of a subsidiary chassis 130 suspended from the under side of main chassis 1 by a plurality of screws, one of which is shown at 129. Loading-system drive mechanism 131 is the drive mechanism for the main loading elements 16 and 17, subsidiary loading elements 18 and 19, pinch roller 20, and the like. Loading-system drive mechanism 131 is constituted by gear train 23 and drive gear 24, shown in FIGS. 8A and 8B, and mode motor 25, gear train 26, cam gear 27, link assembly 28, triggering mechanism 29, partially toothless gear 30 and the like, as shown in FIGS. 9A and 9B. The capstan motor, although not shown in FIG. 13, is also mounted on the lower portion of main chassis 1.

A third subassembly 126 is a flexible circuit board that is arranged between the bottom of subsidiary chassis 130 and a fourth subassembly 127.

As shown in FIG. 13, fourth subassembly 127 is located beneath subsidiary chassis 130 and is constituted such that the pair of reel bases 2 and 3 and a reel-base drive mechanism 136 for driving the pair of reel bases 2 and 3 are mounted on a reel-base securing chassis 135 fixed to main chassis 1 by a plurality of screws, on of which is shown at 134. The mode of reel-base drive mechanism 136 is changed by cam gear 27, not shown in FIG. 13, and reel-base drive mechanism 136 is constituted by a gear mechanism for causing capstan motor 22 to selectively rotate and drive the pair of reel bases 2 and 3.

Third subassembly 126 is mounted on the lower side of subsidiary chassis 130 and comprises a plurality of sensors 133 mounted on a flexible printed-circuit board 132 that is arranged between subsidiary chassis 130 and reel-base securing chassis 135. The plurality of sensors 133 comprise a mode change encoder for detecting the phase of cam gear 27, loading and unloading detection encoders for detecting the phases of partially toothless gear 30, FG sensors for sensing the rotational rate of the pair of reel bases 2 and 3, end sensors for sensing the ends of magnetic tape 10, an insertion detection sensor for detecting the presence of cassette 9, and the like. The pair of reel bases 2 and 3 extend above the main chassis 1 through three pairs of through holes 137, 138, and 139 respectively formed in flexible printed-circuit board 132, subsidiary chassis 130, and main chassis 1.

A fifth subassembly 128 is located below the reel-base securing chassis 135 and includes a control circuit 142 comprising an integrated circuit for controlling loading-system drive mechanism 131 and reel-base drive mechanism 136 formed on a main printed-circuit board 141 that is attached to main chassis 1 by a plurality of screws, one of which is shown at 140. A plurality of terminals are formed on an elongate portion of the flexible printed-circuit board 132 and are shown generally at 132 in FIG. 12. These terminals 132 are connected to control circuit 142 through connector 144. Connector 144 is then connected to control circuit 142 through the plurality of conductors formed on printed circuit board 141.

In the assembly consisting of the first to fifth subassemblies 125 to 128, the flexible printed-circuit board 132 is located between the second subassembly 125 and the fourth subassembly 127. The plurality of sensors 133 required for loading-systems 131 and reel-base drive mechanism 131 and 136 mounted o the second and fourth subassemblies 125 and 127, respectively, can be mounted on the single flexible printed-circuit board 132. When the terminals 143 of flexible printed-circuit board 132 are connected to connector 144 of the main printed-circuit board 141, all wiring connections can be completed. This arrangement means that a large number of wiring harnesses need not be connected between the loading-system and reel-base drive mechanisms 131 and 136 and the main printed-circuit board 141. It is understood that more than one elongate portion of the flexible printed circuit board 132 can be provided, if necessary. The terminals on each of such portions would be connected to a corresponding connector 144 on the main printed circuit board 141.

Since the wiring operations are very simple and extra space for a large number of wiring harnesses is not needed a low-profile tape loading device can be obtained. In addition, after the first to fifth subassemblies 124 to 128 are individually assembled, the second to fifth subassemblies 125 to 128 are sequentially mounted on the first subassembly 124, thereby facilitating assembly and disassembly of the entire tape loading device.

Figure 14:
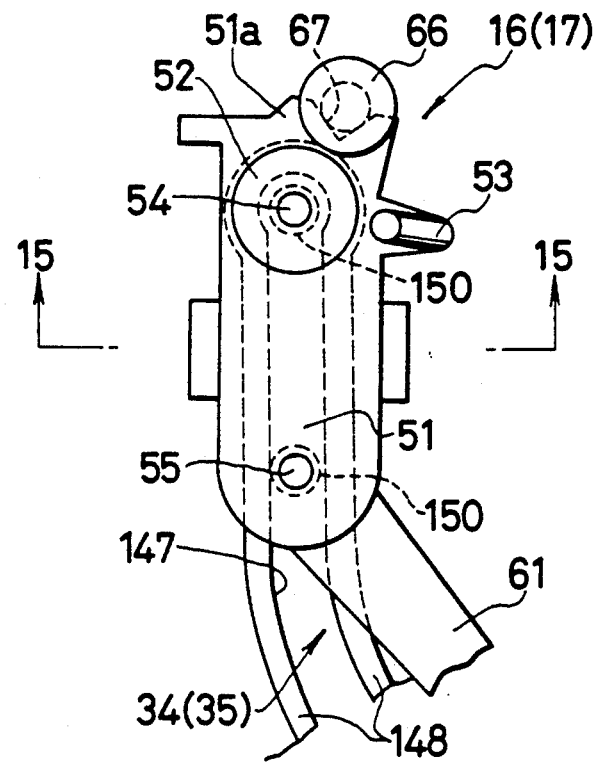
FIG. 14 is an explanatory plan view showing the guide structure of the main loading mechanism of FIGS. 4A and 4B.
Figure 15:
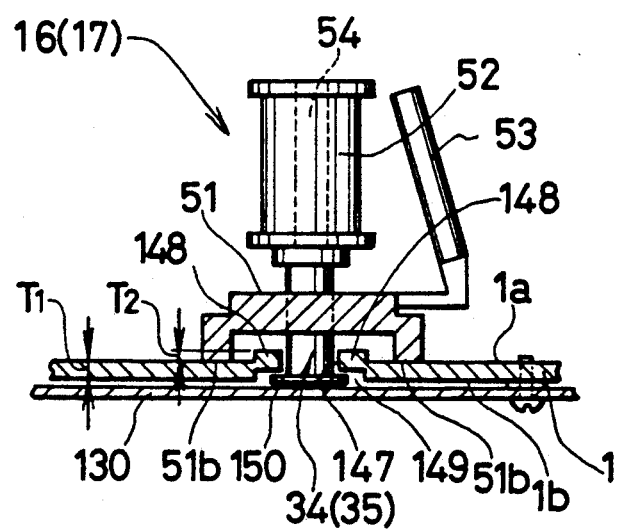
FIG. 15 is a cross-sectional view taken along section lines 15—15 in FIG. 14.

Guide structures for the main loading elements 16 and 17 are shown in FIGS. 14 and 15, in which main chassis 1 is shown comprising a metal plate having a thickness $T_1$ of about 0.6 mm. The guide rails 34 and 35 are formed such that respective guide slots 147 are formed in the main chassis 1, and two projecting side-strips 148 for each guide slot 147 are fabricated to project upwardly by a pressing or stamping operation to a height $T_2$ of about 0.3 mm above the top surface of main chassis 1.

During the metal pressing fabrication of projecting side-strips 148, stepped portions 149 having a depth equal to the height $T_2$ are simultaneously formed along both bottom edges of guide slot 147.

Sliding block 51 that is used in each of the main loading elements 16 and 17 is formed with a substantially U-shaped main body and a pair of sliding surfaces 51b are formed on the lower surface of sliding block 51 and are arranged to bridge over side-strips 148, so that side-strips 148 guide sliding block 51 as it slides along an upper face 1a of chassis 1. The pair of pins 54 and 55 extending downward from the sliding blocks 51 are inserted into the guide slots 147 and each pin 54, 55 has an end flange 150 integrally formed with the lower edges thereof. Flanges 150 on pins 54 and 55 then reside within stepped portions 149 of guide slot 147.

In the guide structure for the main loading elements, the projecting side-strips 148 formed in the main chassis 1 also constitute reinforcing ribs, and main chassis 1 can be reinforced along both sides of the guide slot 147, so that the flatness of main chassis 1 along both sides of guide slot 147 can be assured. In addition, sliding block 51 of each of the main loading elements 16 and 17 is bridged over both the projecting side-strips 148, so that the pair of sliding surfaces 51b can be slid along the upper face 1a of the main chassis 1 with only a small contact area, thereby minimizing the sliding resistance caused by friction. The main loading elements 16 and 17 can be smoothly reciprocated along the main chassis 1. This means that the load on capstan motor 22 for driving the main loading elements 16 and 17 can be reduced, and capstan motor 22 can be rendered compact.

End flanges 150 formed at the lower edges of both pins 54 and 55 are slid along the stepped portions 149 that are formed on the lower face 1b of main chassis 1 along both sides of the guide slots 147, so that the amount that end flanges 150 project from the lower face 1b of main chassis 1 can be reduced. Therefore, the subsidiary chassis 130 and other elements can be arranged quite near lower face 1b of main chassis 1, thereby providing a low-profile construction.

By forming projecting side-strips 148 of guide slot 147 on main chassis 1 by a metal pressing operation, projection side-strips 148 extending on main chassis 1 can function as reinforcing ribs. At the same time, the stepped portions 149 can be formed on the lower face 1b of the main chassis 1 along both sides of the guide slot 147. Therefore, the number of manufacturing steps is reduced, thus, resulting in lowered cost.

The present invention has been exemplified with reference to the preferred embodiments. However, the present invention is not limited to the particular embodiments described above, and various changes and modifications may be made within the technical concepts of the present invention, which is to be defined by the appended claims.

What is claimed is:

1. A tape loading device for use with a magnetic tape cassette, comprising:

rotary head drum means around which a magnetic tape is wrapped at a predetermined angle of contact and having a rotary head for recording and/or reproducing information from the magnetic tape;

tape loading means arranged for reciprocating movement to wrap the magnetic tape around the head drum means and withdraw the magnetic tape from around the head drum means, the magnetic tape being withdrawn from the tape cassette to be wrapped around the head drum means at the predetermined angle of contact;

a capstan motor rotatable in both normal and reverse directions to drive a capstan means so that the magnetic tape travels at a constant speed;

drive gear means driven by the capstan motor;

partially toothless gear means facing the drive gear means so as to be intermittently rotated thereby, and having a cam mechanism for causing the tape loading means to reciprocate over a predetermined distance;

a mode changing mechanism for changing the mode of the tape loading device;

a mode motor rotatable in both normal and reverse directions for putting the mode changing mechanism in action in correspondence with an angle of rotation thereof; and trigger means for mechanically triggering a predetermined amount of rotation of the partially toothless gear, wherein the trigger means is driven due to torque of the mode motor so as to mesh the partially toothless gear with the drive gear means, the partially toothless gear is rotated due to torque of the capstan motor, and the tape loading means is reciprocated due to motion of the cam mechanism of the partially toothless gear.

2. A tape loading device according to claim 1, wherein the tape loading means comprises a plurality of movable first tape loading means which have tape guide portions for directly contacting and guiding the magnetic tape, and a single second tape loading means for selectively driving the plurality of first tape loading means, the second tape loading means being reciprocated due to motion of a second cam mechanism formed on the partially toothless gear.

3. A tape loading device according to claim 2, wherein the first tape loading means comprises a pair of main guide blocks which are moved through respective link assemblies along respective guide rails which are arranged on both sides of the head drum means so as to wrap the magnetic tape around the head drum means at the predetermined angle of contact, and a plurality of subsidiary guide blocks including a pinch-roller holding lever for holding a pinch roller for contacting the capstan means with the magnetic tape arranged therebetween.

4. A tape loading device according to claim 3, further comprising a sheet metal chassis and in which the respective guide rails are formed as raised portions adjacent a respective slot formed in the sheet metal chassis.

5. A tape loading device according to claim 4, further comprising respective guide recesses formed adjacent the respective slot formed in the sheet metal chassis and in which the main guide blocks include a respective pin means extending through the respective slot in the sheet metal chassis.

6. A tape loading device according to claim 5, wherein the pin means includes a flange at an end thereof extending through the slot, the flange cooperating with a respective guide recess in the sheet metal chassis.

7. A tape loading device according to claim 2, wherein the second tape loading means reciprocates substantially in parallel with a line drawn through the centers of a pair of reel bases for driving a pair of reels within the tape cassette; and the second tape loading means has a plurality of drive means for driving the first tape loading means, and a substantially I-shaped groove to which the motion of the first cam mechanism of the partially toothless gear is imparted.

8. A tape loading device according to claim 1, wherein the mode changing mechanism that is put in action by the mode motor comprises a sliding plate for operating a plurality of levers, including a tape-tension detecting lever and a pinch roller lever, the sliding plate reciprocating substantially in parallel with a line drawn through the centers of the pair of reel bases for driving the pair of reels within the tape cassette.

9. A tape loading device according to claim 8, wherein at least a record or play mode and a stop mode are selectively obtained in response to manipulation of the mode changing mechanism.

10. A tape loading device according to claim 8, wherein the sliding plate is reciprocated by a second cam mechanism on the partially toothless gear driven by the mode motor rotating in respective normal and reverse directions.

11. A tape loading device according to claim 1, wherein the trigger means comprises: a triggering lever rotatably supported by a pivot arranged substantially at the center thereof, and selectively rotated in normal or reverse directions in response to the direction of rotation of the mode motor; a coiled torsion spring having two straight ends supported by respective spring stops provided at respective ends of the triggering lever; and at least one projection formed integrally with the partially toothless gear to be resiliently pressed against one of the straight ends of the spring, whereby said at last one projection is selectively rotated in the normal or reverse directions with the partially toothless gear.

12. A tape loading device according of claim 11, wherein the triggering lever is linked with a lever rotated in normal or reverse directions due to motion of the cam mechanism of the partially toothless gear driven by the mode motor.

13. A tape loading device according to claim 11, in which the triggering means comprises a triggering lever rotatably supported by a pivot, and a second coiled torsion spring and wherein the coiled portions of the respective torsion springs of the positioning means and the trigger means are loosely arranged around the pivot of the trigger means.

14. A tape loading device according to claim 13, wherein the coiled portions of the respective torsion springs of the trigger means and the positioning means are loosely arranged around the pivot of the trigger means.

15. A tape loading device according to claim 1, wherein at least one positioning projection is formed integrally with the partially toothless gear and is resiliently pressed against one substantially straight end of a coiled torsion spring included in the positioning means, whereby a toothless portion of the partially toothless gear is positioned in opposed relation to the drive gear.

16. A tape loading device according to claim 1, wherein the mode changing mechanism that is put in action by the mode motor comprises a sliding plate for operating a plurality of levers, including a tape-tension detecting lever and a pinch roller lever, the sliding plate reciprocating substantially in parallel with a line drawn through the centers of the pair of reel bases for driving the pair of reels within the tape cassette, and wherein the triggering means includes a lever rotated in normal or reverse directions due to motion of the cam mechanism of the partially toothless gear driven by the mode motor.

* * * * *